(12) United States Patent
Shoyama et al.

(10) Patent No.: US 9,509,211 B2
(45) Date of Patent: Nov. 29, 2016

(54) BRIDGELESS POWER FACTOR IMPROVEMENT CONVERTER

(71) Applicant: TDK Corporation, Minato-ku, Tokyo (JP)

(72) Inventors: Masahito Shoyama, Fukuoka (JP); Kewei Shi, Fukuoka (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 14/499,597

(22) Filed: Sep. 29, 2014

(65) Prior Publication Data

US 2015/0280548 A1  Oct. 1, 2015

(30) Foreign Application Priority Data

Mar. 28, 2014 (JP) ................................. 2014-068705

(51) Int. Cl.
*H02M 1/42* (2007.01)
*H02M 7/219* (2006.01)
*H02M 1/44* (2007.01)

(52) U.S. Cl.
CPC ......... *H02M 1/4225* (2013.01); *H02M 1/4233* (2013.01); *H02M 1/4208* (2013.01); *H02M 1/44* (2013.01); *H02M 7/219* (2013.01); *Y02B 70/126* (2013.01)

(58) Field of Classification Search
CPC ........... H02M 1/4225; H02M 1/4233; H02M 1/4208; H02M 7/219
See application file for complete search history.

(56) References Cited

U.S. PATENT DOCUMENTS

| | | | | |
|---|---|---|---|---|
| 2005/0146287 | A1* | 7/2005 | Nerone | H05B 41/2881 315/291 |
| 2005/0231254 | A1* | 10/2005 | Young | H02M 7/53871 327/175 |
| 2007/0279955 | A1* | 12/2007 | Liu | H02M 1/4208 363/125 |
| 2009/0303762 | A1* | 12/2009 | Jang | H02M 1/4208 363/61 |
| 2010/0259957 | A1* | 10/2010 | Jin | H02M 1/4208 363/126 |
| 2012/0069615 | A1* | 3/2012 | Tomioka | H02M 1/4208 363/126 |
| 2014/0225552 | A1* | 8/2014 | Shinomoto | H02M 1/4208 318/504 |

FOREIGN PATENT DOCUMENTS

JP   2012-070490 A   4/2012

* cited by examiner

*Primary Examiner* — Fred E Finch, III
*Assistant Examiner* — Rafael O De León Domenech
(74) *Attorney, Agent, or Firm* — Harness, Dickey & Pierce, P.L.C.

(57) ABSTRACT

A bridgeless power factor improvement converter is configured with input terminals to which an AC voltage is input, output terminals from which a DC voltage is output, diodes, first and second switches, first and second coils, a pair of series diodes, and a control circuit. When one input terminal has a positive potential relative to the other input terminal, the control circuit performs a switching operation for only the first switch. When the one input terminal has a negative potential relative to the other input terminal, the control circuit performs the switching operation for only the second switch. A capacitor, which is provided independently from the pair of series diodes, is connected to at least one of the pair of series diodes in parallel.

19 Claims, 11 Drawing Sheets

BRIDGELESS POWER FACTOR IMPROVEMENT CONVERTER

CROSS-REFERENCE TO RELATED APPLICATION

This application claims priority to Japanese Patent Application No. 2014-068705 filed Mar. 28, 2014 which is hereby expressly incorporated by reference herein in its entirety.

BACKGROUND

The present invention relates to a bridgeless power factor improvement converter that does not have a diode bridge circuit that rectifies an input alternating current (AC) voltage.

As this kind of the bridgeless power factor improvement converter (also simply referred to as "a converter" below), Applicant has already proposed a converter that is disclosed in Japanese Patent Publication Number 2012-70490. The converter explained above is configured with an inductor, first and second switching elements, and first and second diodes. Specifically, a first terminal of the inductor is connected to one terminal of an AC power source. A first terminal of the first switching element is connected to a second terminal of the inductor. In the first diode, an anode is connected to a second terminal of the first switching element, and at the same time, a cathode is connected to the other terminal of the AC power source. A first terminal of the second switching element is connected to the second terminal of the inductor. In the second diode, a cathode is connected to a second terminal of the second switching element, and at the same time, an anode is connected to the other terminal of the AC power source.

In the converter that has the configuration explained above, the first switching element is a target of a high frequency switching at a positive half cycle of an input voltage (an AC voltage) that is supplied from the AC power source. The second switching element is a target of the high frequency switching at a negative half cycle. Further, during the positive half cycle of the input voltage in which the first switching element is the target of the high frequency switching, the second switching element stays in an OFF state. As a result, the second diode that cooperates with the second switching element also stays in the OFF state. On the other hand, during the negative half cycle of the input voltage in which the second switching element is the target of the high frequency switching, the first switching element stays in the OFF state. As a result, the first diode that cooperates with the first switching element also stays in the OFF state.

Therefore, during the positive half cycle of the input voltage in which the first switching element is the target of the high frequency switching, both ends of the second diode, which stays in the OFF state, are in a state in which an output voltage is applied to the cathode terminal with respect to the anode terminal as a reference. That is, a parasitic capacitor (also referred to as "a parasitic capacitance" below) of the second diode that stays in the OFF state is charged to the output voltage and at the same time, the parasitic capacitance of the first diode that stays in an ON state is discharged so as to be substantially zero volts. On the other hand, during the negative half cycle of the input voltage in which the second switching element is a target of the high frequency switching, both ends of the first diode, which stays in the OFF state, are in a state in which the output voltage is applied to the cathode terminal with respect to the anode terminal as a reference. That is, a parasitic capacitance of the first diode that stays in the OFF state is charged to the output voltage and at the same time, the parasitic capacitance of the second diode that stays in the ON state is discharged so as to be substantially zero volts.

As explained above, immediately after a point (a zero-cross point) at which the input voltage is switched from negative to positive or from positive to negative, because the diode that stays in the OFF state is shifted to the ON state, the voltage of both ends of the parasitic capacitance of the diode is discharged from the output voltage to substantially zero volts. Similarly, because the diode that stays in the ON state is shifted to the OFF state, the voltage of both ends of the parasitic capacitance of the diode is charged from zero volts to the output voltage. As a result, the voltage of a node connected between the first diode and the second diode fluctuates by a voltage value of the output voltage.

Therefore, when the switching element that is the target of the high frequency switching starts a switching operation at an normal ON time ratio (because the input voltage is low immediately after the zero-cross point, a large ON time ratio that is prescribed in advance is used) immediately after the zero-cross point, the voltage of both ends of the parasitic capacitance of the diode that stays in the OFF state is rapidly discharged from the output voltage to substantially zero volts, and at the same time, the voltage of both ends of the parasitic capacitance of the diode that stays in the ON state is rapidly charged to the output voltage. As a result, the voltage of the node connected between the first diode and the second diode rapidly fluctuates by the voltage value of the output voltage. Therefore, in this converter, a surge current is generated because the voltage of this node rapidly fluctuates by the voltage value of the output voltage. Further, EMI noise increases.

Accordingly, in the converter that is disclosed in Japanese Patent Publication Number 2012-70490, soft start control is used for a switching element that is a target of a high frequency switching immediately after a zero-cross point. The soft start control makes an ON time ratio increase gradually from 0% to a normal ON time ratio. As a result, the discharging and charging operations for the parasitic capacitance of the diode explained above are gradually performed. Thus, because the rapid fluctuation by the voltage value of the output voltage that is generated at the node of each diode is avoided, both the cause of the generation of the surge current and the biggest cause of the EMI noise are removed.

The conventional converter describe above, however, can be improved. That is, in the conventional converter, because the soft start control in which the ON time ratio is gradually increased for the switching element (a switch) needs to be performed immediately after the zero-cross point of the input voltage, the switching control for the switching element is complicated.

SUMMARY

An object of the present invention is to provide a bridgeless power factor improvement converter that can suppress noise generation while avoiding complicated switching control for a switch.

In order to achieve the above object, a bridgeless power factor improvement converter according to one aspect of the present invention is configured with a pair of input terminals, a pair of output terminals, a first rectifying device, a first switch, a second rectifying device, a second switch, a first coil, a second coil, a pair of series rectifying devices and a control circuit. Specifically, an AC voltage is input to the pair of the input terminals. An output voltage is output from the pair of output terminals in which one of the output terminals has a positive potential relative to the other of the output terminals. A current output terminal of the first rectifying device is connected to the one of the output terminals. The first switch is connected between a current input terminal of the first rectifying device and the other of the output terminals. A current input terminal of the second rectifying device is connected to the other of the output terminals. The second switch is connected between the current output terminal of the second rectifying device and the one of the output terminals. An end of the first coil is connected to one of the input terminals and the other end of the first coil is connected to a node connected between the first rectifying device and the first switch. An end of the second coil is connected to the one of the input terminals and the other end of the second coil is connected to a node connected between the second rectifying device and the second switch. The pair of the series rectifying devices is connected in series in a forward direction, and at the same time, a current output terminal is connected to the one of the output terminals and a current input terminal is connected to the other of the output terminals. Further, a node connected between the series rectifying devices is connected to the other of the input terminals. In the period in which the one of the input terminals is a positive voltage with respect to the other of the input terminals based on the AC voltage, the control circuit makes only the first switch perform a switching operation. In the period in which the one of the input terminals is a negative voltage with respect to the other of the input terminals based on the AC voltage, the control circuit makes only the second switch perform the switching operation. Further, a capacitor, which is provided independently or separately from the series rectifying devices, is connected to at least one of the pair of the series rectifying devices in parallel.

Further, a bridgeless power factor improvement converter according to one aspect of the present invention is configured with a pair of input terminals, a pair of output terminals, a first switch, a second switch, a coil, a pair of series rectifying devices and a control circuit. Specifically, an AC voltage is input to the pair of the input terminals. An output voltage is output from the pair of output terminals in which one of the output terminals has a positive potential relative to the other of the output terminals. The first switch is connected to the other of the output terminals. The second switch is connected between the first switch and the one of the output terminals so as to be connected in series with the first switch. An end of the coil is connected to one of the input terminals and the other end of the coil is connected to a node connected between the first switch and the second switch. The pair of the series rectifying devices is connected in series in a forward direction, and at the same time, a current output terminal is connected to the one of the output terminals and a current input terminal is connected to the other of the output terminals. Further, a node connected between the series rectifying devices is connected to the other of the input terminals. In the period in which the one of the input terminals is a positive voltage with respect to the other of the input terminals based on the AC voltage, the control circuit makes only the first switch perform a switching operation. In the period in which the one of the input terminals is a negative voltage with respect to the other of the input terminals based on the AC voltage, the control circuit makes only the second switch perform the switching operation. Further, a capacitor, which is provided independently or separately from the series rectifying devices, is connected to at least one of the pair of the series rectifying devices in parallel.

The bridgeless power factor improvement converter according to the aspect of the present invention further includes a pair of the series capacitors, a resonance inductor and a first bidirectional switch. Specifically, the pair of the series capacitors is connected in series between the pair of the output terminals. The resonance inductor and the first bidirectional switch are connected in series between a node of the pair of the series capacitors and the node of the pair of the series rectifying devices. The first bidirectional switch is turned ON by the control circuit during a dead time period that is provided between an ON period of the first switch and an ON period of the second switch in synchronization with a polarity change of the AC voltage.

Further, the bridgeless power factor improvement converter according to the aspect of the present invention further includes a pair of clamping rectifying devices. Specifically, the pair of the clamping rectifying devices is connected in series in a forward direction. With respect to the pair of the clamping rectifying devices, a current output terminal is connected to the one of the output terminals and a current input terminal is connected to the other of the output terminals. At the same time, the node connected between the pair of clamping rectifying devices is connected to a node connected between the resonance inductor and the first bidirectional switch.

Further, the bridgeless power factor improvement converter according to the aspect of the present invention further includes a clamping circuit that is connected in parallel to the resonance inductor. The clamping circuit decreases a voltage that is generated between both ends of the resonance inductor.

Further, in the bridgeless power factor improvement converter according to the aspect of the present invention, the clamping circuit is a resistor that is connected to the resonance inductor in parallel.

Further, in the bridgeless power factor improvement converter according to the aspect of the present invention, the clamping circuit is a pair of Zener diodes that are connected in series in an opposite direction to each other and that are connected to the resonance inductor in parallel.

Further, in the bridgeless power factor improvement converter according to the aspect of the present invention, the clamping circuit is a second bidirectional switch that is connected to the resonance inductor in parallel. The control circuit drives the first bidirectional switch to be in an OFF state from an ON state and concurrently drives the second bidirectional switch to be temporarily in the ON state.

According to the bridgeless power factor improvement converter of the aspect of the present invention, because a parallel capacitor, which is provided independently or separately from the series rectifying devices, is connected to at least one of the series rectifying devices in parallel, voltage fluctuation of the input terminal, which is connected to a node connected between the pair of the series rectifying devices, can be made gradual by the parallel capacitor. A voltage of this node fluctuates by a voltage value of the output voltage whenever a voltage polarity of the AC voltage is switched. As a result, in the bridgeless power factor improvement converter, because the surge current that is generated due to the voltage fluctuation is significantly lowered, a level of the generated EMI (a terminal noise voltage) noise is considerably suppressed. In addition, although the soft start control in which a duty ratio is gradually increased with respect to a switch is not implemented, the level of the generated EMI (a terminal noise voltage) noise is considerably suppressed. Thus, because the soft start control is not necessary, switching control for a switch can be simplified.

According to the bridgeless power factor improvement converter of the aspect of the present invention, the resonance inductor and the first bidirectional switch are connected in series between the node of the pair of the series capacitors and the node of the pair of the series rectifying devices. Because the first bidirectional switch is turned ON by the control circuit during the dead time period, a resonance current is generated during a predetermined period (a period within the dead time period) in which the first bidirectional switch is turned ON. Thus, the parallel capacitor can be charged and discharged by the resonance current. In the bridgeless power factor improvement converter, during the dead time period in which the voltage polarity is switched from positive to negative, the voltage of the node connected between the series rectifying devices increases gently from zero volts, and after that, increases toward the output voltage at a substantially constant change rate. Then, the change rate gently decreases before reaching the termination of the predetermined period. After that, the voltage can converge to a voltage that is the same as the output voltage. Further, during the dead time period in which the voltage polarity is switched from negative to positive, the voltage of the node connected between the series rectifying devices decreases gently from the voltage that is the same as the output voltage, and after that, decreases toward zero volts at a substantially constant change rate. Then, the change rate gently decreases before reaching the termination of the predetermined period. After that, the voltage can converge to zero volts. Therefore, in the bridgeless power factor improvement converter, the EMI noise (the noise terminal voltage) that is generated by the voltage fluctuation at the node of the pair of series rectifying device can be significantly suppressed.

Further, according to the bridgeless power factor improvement converter of the aspect of the present invention, a resonance current that changes a voltage of the node of the pair of series rectifying device from zero volts to the DC voltage and a resonance current that that changes the voltage of the node of the pair of series rectifying device from the DC voltage to zero volts can flow only in the two paths, i.e., the series circuit of the first bidirectional switch and the resonance inductor, the parallel capacitor and the output capacitor and cannot flow in a side of the input terminals. Therefore, in the bridgeless power factor improvement converter, the superposition of the resonance current to the input current can be avoided.

According to the bridgeless power factor improvement converter of the aspect of the present invention, one of the pair of clamping rectifying devices and the clamping circuit that is connected to the resonance inductor in parallel is provided in addition to the resonance inductor and the first bidirectional switch that are connected in series. Thus, in a case in which the resonance current flowing in the resonance inductor does not become zero amperes at the termination of the predetermined period in which the first bidirectional switch is turned ON, the voltage (a voltage applied to both ends of the first bidirectional switch), which is generated at both ends of the resonance inductor according to the resonance current flowing in the resonance inductor when the first bidirectional switch is turned OFF, can be lower than a breakdown voltage of the first bidirectional switch by using the pair of clamping rectifying devices or the clamping circuit.

DESCRIPTION OF EXEMPLARY EMBODIMENTS

A bridgeless power factor improvement converter according to an embodiment of the present invention is explained with reference to the drawings.

Figure 1:
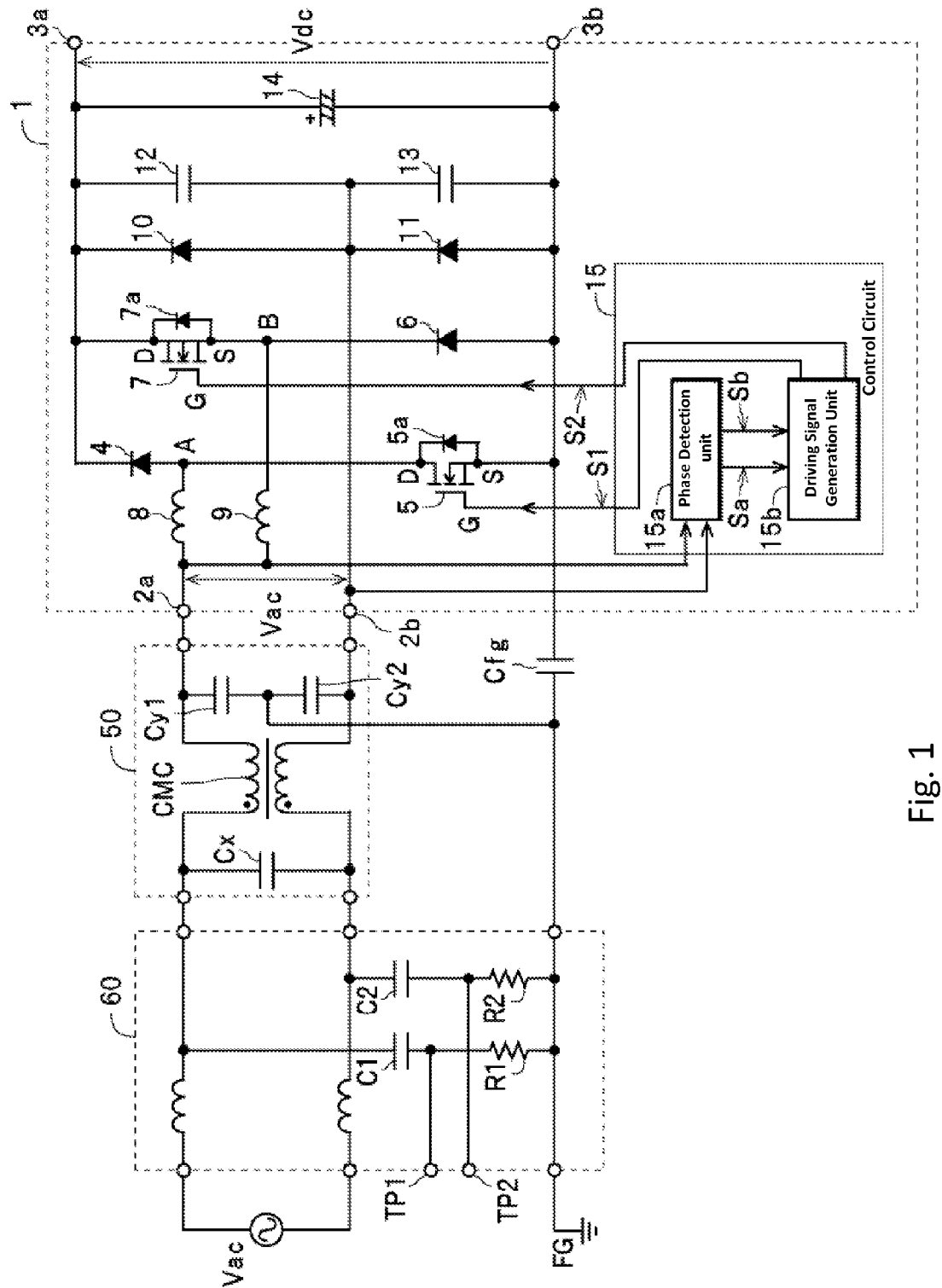
FIG. 1 is a circuit diagram that shows a converter 1 and shows a measurement circuit of an EMI noise (a noise terminal voltage) according to an embodiment of the present invention.

First, a configuration of a converter 1 shown in FIG. 1 as an example of the bridgeless power factor improvement converter (also referred to as "a converter" below) according to the embodiment of the present invention is explained.

The converter 1 is configured with a pair of input terminals 2a and 2b (also referred to as "a input terminal 2" below when not distinguished), a pair of output terminals 3a and 3b (also referred to as "an output terminal 3" when not distinguished), a first rectifying device 4, a first switch 5, a second rectifying device 6, a second switch 7, a first coil 8, a second coil 9, a pair of series rectifying devices 10 and 11, a pair of parallel capacitors 12 and 13, an output capacitor 14 and a control circuit 15. Further, in the converter 1 explained above, an AC voltage Vac (an AC voltage such as an AC 100V of a commercial frequency that corresponds to 50 Hz or 60 Hz) that is input to the pair of the input terminals 2a and 2b is converted into a DC voltage Vdc (for instance, about DC 390V). The DC voltage Vdc is output from the pair of the output terminals 3a and 3b as an output voltage. In this case, the DC voltage Vdc is output from between the pair of the output terminals 3a and 3b in which one output terminal 3a of the pair of the output terminals 3a and 3b has a positive potential relative to the other output terminal 3b (a reference potential) of the pair of the output terminals 3a and 3b.

In the converter 1 explained above, the first rectifying device 4 is, as an example, a diode (also referred to as "a diode 4" below) and a current output terminal of the first rectifying device 4 (in the embodiment, a cathode terminal of the diode 4) is connected to the output terminal 3a. The first switch 5 is connected between a current input terminal of the first rectifying device 4 (in the embodiment, an anode terminal of the diode 4) and the output terminal 3b. In the embodiment of the present invention, the first switch 5 is, as an example, an N channel MOSFET (metal oxide semiconductor field effect transistor). Further, because a drain terminal of the first switch 5 is connected to the anode terminal of the diode 4 and a source terminal of the first switch 5 is connected to the output terminal 3b, the first switch 5 is connected between the anode terminal of the diode 4 and the output terminal 3b. The first switch 5 is shifted to be an ON state when a driving signal S1 that is output from the control circuit 15 is input (specifically, a logic of a driving signal S1 is the high state (logic high)), and is shifted to be an OFF state in other situations. Further, a parasitic diode 5a is formed in the first switch 5.

Further, the second rectifying device 6 is, as an example, a diode (also referred to as "a diode 6" below) and a current input terminal of the second rectifying device 6 (in the embodiment, an anode terminal of the diode 6) is connected to the output terminal 3b. The second switch 7 is connected between a current output terminal of the second rectifying device 6 (in the embodiment, a cathode terminal of the diode 6) and the output terminal 3a. In the embodiment of the present invention, the second switch 7 is, as an example, the same N channel MOSFET as the first switch 5. Further, because a drain terminal of the second switch 7 is connected to the output terminal 3a and a source terminal of the second switch 7 is connected to the cathode terminal of the diode 6, the second switch 7 is connected between the cathode terminal of the diode 6 and the output terminal 3a. The second switch 7 is shifted to be an ON state when a driving signal S2 that is output from the control circuit 15 is input (specifically, a logic of the driving signal S2 is the high state (logic high)), and is shifted to be an OFF state in other situations. Further, a parasitic diode 7a is formed in the second switch 7.

Further, the first rectifying device 4 and the second rectifying device 6 can also be a synchronization rectifying device such as a MOSFET that is controlled in order to perform a synchronous rectification operation by the control circuit 15.

One end of the first coil 8 is connected to one input terminal 2a of the pair of the input terminal 2a and 2b and the other end of the first coil 8 is connected to a node A connected between the diode 4 and the first switch 5. One end of the second coil 9 is connected to the input terminal 2a and the other end of the second coil 9 is connected to a node B connected between the diode 6 and the second switch 7.

A series rectifying device 10 that is one of the pair of the series rectifying devices 10 and 11 is, as an example, a diode (also referred to as "a series diode 10" below) and a current output terminal of the series rectifying device 10 (in the embodiment, an cathode terminal of the series diode 10) is connected to the output terminal 3a. A current input terminal of the series rectifying device 10 (in the embodiment, an anode terminal of the series diode 10) is connected to the input terminal 2b. Further, a series rectifying device that is the other of the pair of the series rectifying devices 10 and 11 is, as an example, a diode (also referred to as "a series diode 11" below). Further, a current output terminal of the series rectifying device 11 (in the embodiment, a cathode terminal of the series diode 11) is connected to the input terminal 2b. A current input terminal of the series rectifying device 11 (in the embodiment, an anode terminal of the series diode 11) is connected to the output terminal 3b. Further, a diode in which a reverse direction recovery time is short is used for the series diodes 10 and 11.

A parallel capacitor 12 that corresponds to one of the pair of the parallel capacitors 12 and 13 is another capacitor, which is provided independently or separately from a series diode 10, for instance, such as a ceramic capacitor or a film capacitor, is connected to the series diode 10 in parallel. Further, in the same manner as the parallel capacitor 12, a parallel capacitor 13 that corresponds to the other of the pair of the parallel capacitors 12 and 13 is also another capacitor, which is provided independently or separately from a series diode 11, for instance, such as a ceramic capacitor or a film capacitor, is connected to the series diode 11 in parallel. Further, a parasitic capacitance (a junction capacitance) exists in a diode though a capacitance value is different. The parasitic capacitance (for instance, a capacitance value of from several tens pF to one hundred and several tens pF) exists also in the series rectifying devices 10 and 11. Therefore, capacitance values of the parallel capacitors 12 and 13 are prescribed to be a larger value (for instance, a capacitance value of substantially several hundreds nF) than the capacitance value of the parasitic capacitance. Note that the above "another capacitor, which is provided independently or separately from a series diode 10 (11)" means that unless the another capacitor is a capacitor that is formed in a parasitic manner with respect to the series diode 10 (11), the another capacitor can be any capacitor that is provided independently or separately from the series diode 10 (11). The above is applied to other embodiments below.

Further, in the embodiment, as an example, though the capacitance values of the parallel capacitors 12 and 13 are prescribed to be the same, the capacitance values can also be prescribed to be different. In a general converter including the converter 1, as discussed next, an impedance between the pair of the output terminals 3a and 3b (an output impedance of the converter 1) is configured to be low. Therefore, as a configuration of the parallel capacitors 12 and 13, the parallel capacitors 12 and 13 are equivalently connected in parallel between the input terminal 2b and either one of the output terminals 3a and 3b (for instance, the output terminal 3a). Therefore, when a combined capacitance value of the parallel capacitors 12 and 13 is more than the capacitance value that is prescribed in advance (a reference capacitance value), it is possible that one capacitance value of the parallel capacitors 12 and 13 is increased and the other capacitance value is decreased. Further, it is also possible to adopt a configuration in which the capacitor of which the capacitance value that is more than the reference capacitance value is used as the one of the parallel capacitors 12, 13 and the other of the parallel capacitors 12 and 13 is omitted.

The output capacitor 14 is connected between the pair of the output terminals 3a and 3b. Further, as the output capacitor 14, a capacitor in which the capacitance value is sufficiently large (for instance, an electrolytic capacitor that corresponds to substantially several hundred µF) is used in order to sufficiently decrease the impedance between the pair of the output terminals 3a and 3b (the output impedance of the converter 1).

The control circuit 15 is configured with a phase detection unit 15a and a driving signal generation unit 15b. The control circuit 15 generates the driving signals S1 and S2 for the first switch 5 and the second switch 7 by switching according to a voltage polarity of the AC voltage Vac while monitoring the state of the AC voltage Vac.

Figure 2:
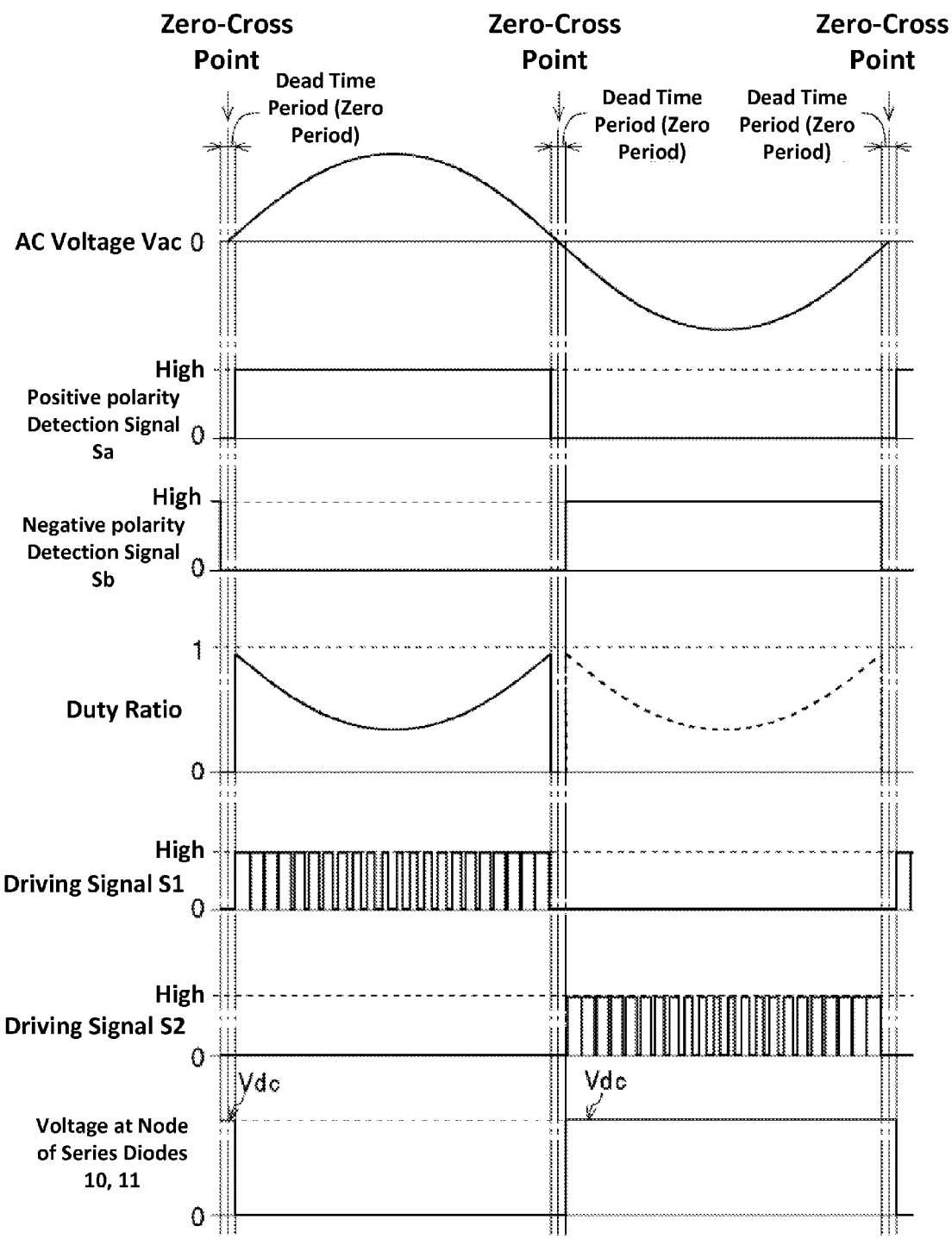
FIG. 2 is a waveform diagram to explain an operation of the converter 1 according to an embodiment of the present invention.

Specifically, as shown in FIG. 2, in the control circuit 15, the phase detection unit 15a monitors the state of the AC voltage Vac and performs an operation for detecting a zero-cross point at which the voltage polarity is switched from a negative to a positive, or from a positive to a negative. Further, the phase detection unit 15a generates a positive polarity detection signal Sa and a negative polarity detection signal Sb based on a detection result of the zero-cross point. Specifically, the positive polarity detection signal Sa corresponds to a logic high through a period in which the polarity of the AC voltage Vac corresponds to the positive and corresponds to a logic zero during a period in other situations. Further, the negative polarity detection signal Sb corresponds to the logic high through a period in which the polarity of the AC voltage Vac corresponds to the negative and corresponds to the logic zero (a logic is the low state) during a period in other situations. Further, the phase detection unit 15a generates the positive polarity detection signal Sa and the negative polarity detection signal Sb by adding a zero period that corresponds to an appropriate length so as to make both correspond to logic zero between both detection signals Sa and Sb. That is, the phase detection unit 15a adds an appropriate period (a dead time period) in which both of two driving signals S1 and S2 are not output before and after the zero-cross point between the driving signal S1 and the driving signal S2. Specifically, the driving signal S1 is generated based on the positive polarity detection signal Sa and the driving signal S2 is generated based on the negative polarity detection signal Sb by the driving signal generation unit 15b.

The driving signal generation unit 15b has a configuration in which a pulse signal (a signal that corresponds to a logic high during the output period and corresponds to a logic zero during the period in other situations) can be generated internally. Specifically, the pulse signal has a higher frequency (for instance, substantially several hundred kHz) than the frequency of the AC voltage Vac. At the time of the generation of the pulse signal, the driving signal generation unit 15b determines whether either of the driving signal S1 and the driving signal S2 is generated and whether neither of the driving signal S1 and the driving signal S2 is generated based on the logics of the positive polarity detection signal Sa and the negative polarity detection signal Sb that are input from the phase detection unit 15a.

Specifically, as shown in FIG. 2, when both of the logics of the positive polarity detection signal Sa and the negative polarity detection signal Sb correspond to zero (at the dead time period explained above), the driving signal generation unit 15b determines to generate neither of the driving signals S1 and S2 and stops the generation of the pulse signal. Therefore, the control circuit 15 stops the output of the driving signals S1 and S2.

Further, when the driving signal generation unit 15b is in the stop state in which the generation of the pulse signal is stopped and detects that the logic of the positive polarity detection signal Sa becomes high from zero, during the period in which from this detection point until the logic of the positive polarity detection signal Sa become zero from high, the driving signal generation unit 15b determines to generate the pulse signal as the driving signal S1 and generates the pulse signal as the driving signal S1. Then, the driving signal generation unit 15b outputs the driving signal S1 to a gate terminal of the first switch 5. Further, when the driving signal generation unit 15b is in the stop state explained above and detects that the logic of the negative polarity detection signal Sb becomes high from zero, during the period in which from this detection point until the logic of the negative polarity detection signal Sb become zero from high, the driving signal generation unit 15b determines to generate the pulse signal as a driving signal S2 and generates the pulse signal as the driving signal S2. Then, the driving signal generation unit 15b outputs the driving signal S2 to a gate terminal of the second switch 7.

According to the configuration explained above, based on the AC voltage Vac, except for the dead time period, when the polarity of the AC voltage Vac corresponds to positive (a period in which the voltage of the input terminal 2a has a positive potential relative to the input terminal 2b), the control circuit 15 makes only the first switch 5 perform the switching operation. When the polarity of the AC voltage Vac corresponds to negative (a period in which the voltage of the input terminal 2a has a negative potential relative to the input terminal 2b), the control circuit 15 makes only the second switch 7 perform the switching operation.

Further, when the driving signal generation unit 15b starts to generate the pulse signal as the driving signal S1 or the driving signal S2, while grasping a change of an instantaneous value of the AC voltage Vac based on a length of a period of the logic high of the positive polarity detection signal Sa and the negative polarity detection signal Sb (a length that corresponds to substantially a half cycle of the AC voltage Vac) and an elapsed time from the point of the time in which the logic of the positive polarity detection signal Sa or the negative polarity detection signal Sb is shifted from zero to high, the driving signal generation unit 15b suppresses the fluctuation of the DC voltage Vdc by controlling a duty ratio of the pulse signal within a variable range that is prescribed in advance.

Specifically, as shown in FIG. 2, when an absolute value of the instantaneous value of the AC voltage Vac immediately after the driving signal generation unit 15b starts to generate the pulse signal (immediately after the logic of the positive polarity detection signal Sa or the negative polarity detection signal Sb is shifted from zero to high) is small, the driving signal generation unit 15b makes the duty ratio of the pulse signal correspond to the largest value within the variable range explained above. After that, the driving signal generation unit 15b makes the duty ratio of the pulse signal decrease gradually according to the increase of the absolute value of the instantaneous value of the AC voltage Vac. Further, when the absolute value of the instantaneous value of the AC voltage Vac becomes the largest, the driving signal generation unit 15b makes the duty ratio correspond to the smallest value. After that, the driving signal generation unit 15b makes the duty ratio of the pulse signal increase gradually according to the decrease of the absolute value of the instantaneous value of the AC voltage Vac. Then, when the absolute value of the instantaneous value of the AC voltage Vac immediately before the driving signal generation unit 15b stops generating the pulse signal (immediately before the logic of the positive polarity detection signal Sa or the negative polarity detection signal Sb is shifted from high to zero) is small, the driving signal generation unit 15b makes the duty ratio of the pulse signal correspond to the largest value within the variable range explained above. Thus, the driving signal generation unit 15b controls the duty ratio of the pulse signal.

Figure 3:
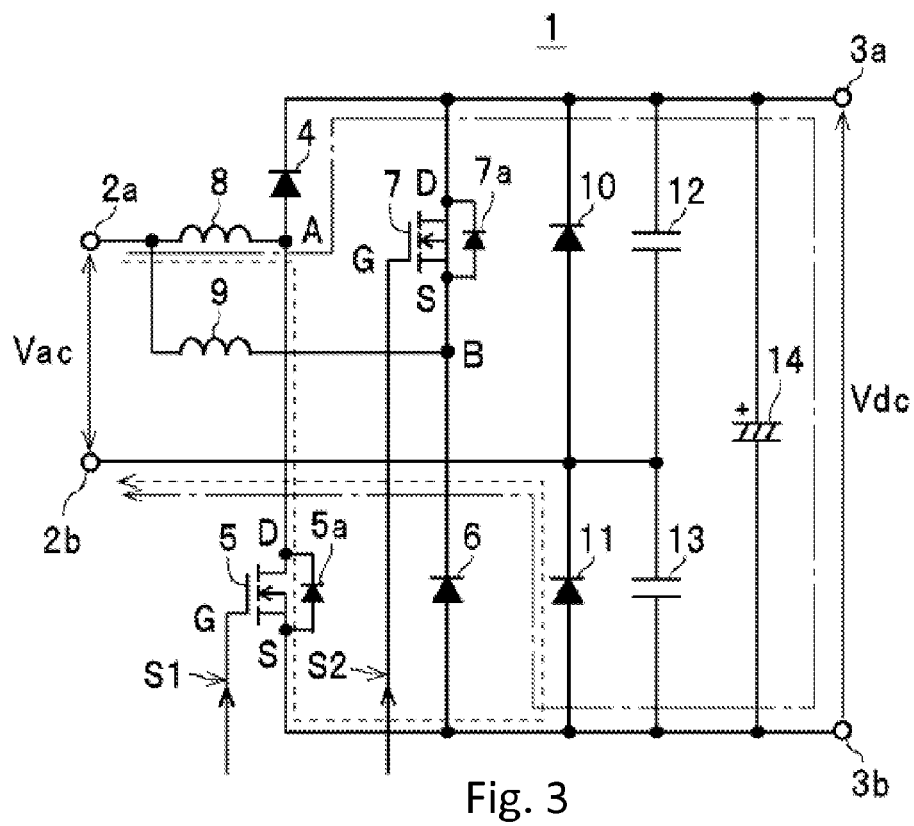
FIG. 3 is a circuit diagram to explain an operation of the converter 1 according to an embodiment of the present invention.
Figure 4:
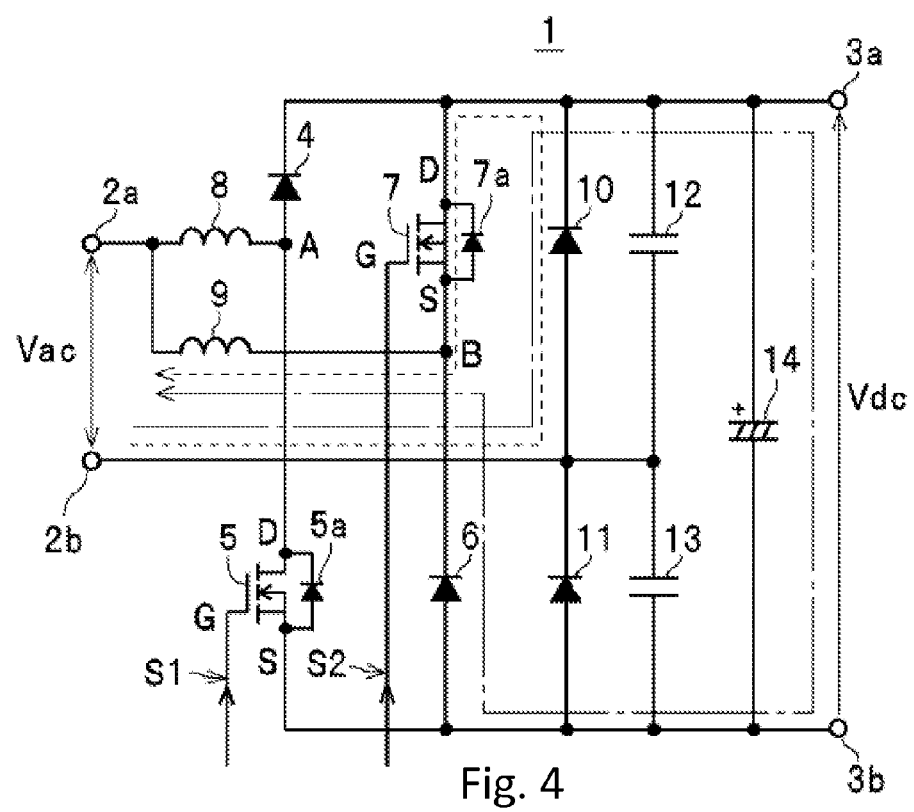
FIG. 4 is a circuit diagram to explain an operation of the converter 1 according to an embodiment of the present invention.

Next, an operation according to the converter 1 itself is explained with reference to FIGS. 3 and 4. Further, a load (not shown) is connected between the output terminals 3a and 3b.

As explained above, in the converter 1, based on the AC voltage Vac, when the polarity of the AC voltage Vac is positive (a period in which the voltage of the input terminal 2a has a positive potential relative to the input terminal 2b), the control circuit 15 maintains the second switch 7 in the OFF state and makes only the first switch 5 perform the switching operation. In this case, when the first switch 5 is in the ON state, an electric current flows in a path that is indicated by a broken line shown in FIG. 3, i.e., the path starts from the input terminal 2a, via the first coil 8, the first switch 5 in the ON state and the series diode 11 and back to the input terminal 2b. As a result, energy is accumulated into the first coil 8. Further, in this state, energy is supplied to the load from the output capacitor 14.

When the first switch 5 is shifted from the ON state to the OFF state in this switching state, the energy that is accumulated into the first coil 8 is released. As a result, the electric current flows in a path that is indicated by a dashed line shown in FIG. 3, i.e., the path starts from the input terminal 2a, via the first coil 8, the diode 4, the output terminal 3a, the load (not shown) (and the output capacitor 14), the output terminal 3b and the series diode 11, and back to the input terminal 2b. Then, the DC voltage Vdc is output from between the pair of the output terminals 3a and 3b.

On the other hand, as explained above, based on the AC voltage Vac, when the polarity of the AC voltage Vac is negative (a period in which the voltage of the input terminal 2a has a negative potential relative to the input terminal 2b), the control circuit 15 maintains the first switch 5 in the OFF state and makes only the second switch 7 perform the switching operation. In this case, when the second switch 7 is in the ON state, the electric current flows in a path that is indicated by a broken line shown in FIG. 4, i.e., the path starts from the input terminal 2b, via the series diode 10, the second switch 7 in the ON state and the second coil 9 and back to the input terminal 2a. As a result, energy is accumulated into the second coil 9. Further, in this state, energy is supplied to the load from the output capacitor 14.

When the second switch 7 is shifted from the ON state to the OFF state in this switching state, the energy that is accumulated into the second coil 9 is released. As a result, the electric current flows in a path that is indicated by a dashed line shown in FIG. 4, i.e., the path starts from the input terminal 2b, via the series diode 10, the output terminal 3a, the load (not shown) (and the output capacitor 14), the output terminal 3b, the diode 6 and the second coil 9, and back to the input terminal 2a. Then, the DC voltage Vdc is output from between the pair of the output terminals 3a and 3b.

Further, as shown in FIG. 2, in the converter 1, when the polarity of the AC voltage Vac is positive (specifically, in the state in which only the first switch 5 performs the switching operation), because the series diode 11 always stays in the ON state, a voltage of the node connected between the pair of the series diodes 10 and 11 (that is, the input terminal 2b) stays in the state in which the voltage substantially corresponds to the voltage of the output terminal 3b. Further, in reality, the voltage of the node connected between the pair of the series diodes 10 and 11 is lower than the voltage of the output terminal 3b by a forward voltage of the series diode 11. However, because the forward voltage of the series diode 11 can be ignored as compared with the DC voltage Vdc, the voltage of the node connected between the pair of the series diodes 10 and 11 can be regarded as substantially the same as the voltage of the output terminal 3b (zero volts).

On the other hand, when the polarity of the AC voltage Vac is negative (specifically, in the state in which only the second switch 7 performs the switching operation), because the series diode 10 always stays in the ON state, the voltage of the node connected between the pair of the series diodes 10 and 11 (that is, the input terminal 2b) stays in the state in which the voltage corresponds to the voltage of the output terminal 3a (the DC voltage Vdc).

Therefore, the converter 1 has a configuration in which the pair of the series diodes 10 and 11 are connected between the pair of the output terminals 3a and 3b, and the series diodes 10 and 11 are alternately shifted to the ON state every time the polarity of the AC voltage Vac is switched. Therefore, at the time in which the series diode is shifted from the OFF state to the ON state (when the polarity of the AC voltage Vac is shifted from negative to positive, a time in which the first switch 5 is shifted to the ON state for the first time after the dead time period. Similarly, when the polarity of the AC voltage Vac is shifted from positive to negative, a time in which the second switch 7 is shifted to the ON state for the first time after the dead time period), the voltage of the node connected between the pair of the series diodes 10 and 11 (that is, the input terminal 2b) fluctuates by the DC voltage Vdc.

As explained in the background section, when the voltage of the node connected between the series diodes 10 and 11 (that is, the input terminal 2b) rapidly fluctuates (when a variation amount of the voltage (an absolute value of dV/dt) is large), the generation of the surge current due to this large fluctuation and an increase of the EMI noise are possible.

However, in the converter 1, the parallel capacitor in which the capacitance value is sufficiently larger than the parasitic capacitance of the series diode is connected in parallel to at least one of the pair of the series diodes 10 and 11 (in the embodiment, as an example, the parallel capacitors 12 and 13 are respectively connected to the series diodes 10 and 11 in parallel). This parallel capacitor is provided independently or separately from the series diodes. As a result, the time that is required for making the parallel capacitor that is connected in parallel to the one of the series diodes discharge when the one series diode in the OFF state of the pair of the series diodes 10 and 11 is shifted to the ON state, is lengthened. Similarly, the time that is required for making the parallel capacitor that is connected in parallel to the other series diode charge when the other series diode in the ON state is shifted to the OFF state, is lengthened. That is, a voltage fluctuation that is generated at the node connected between the series diodes 10 and 11 (that is, the input terminal 2b) is mitigated (the variation amount of the voltage (the absolute value of dV/dt) is decreased) in the converter 1.

As a result, the converter 1 can significantly decrease the surge current that is generated due to the fluctuation of the voltage of the node connected between the series diodes 10 and 11 (that is, the input terminal 2b) and can significantly suppresses the level of the EMI noise that is generated according to the voltage fluctuation.

An experimental result of an evaluation of a conduction noise according to the converter 1 is explained below. Further, in the converter 1, an EMC filter 50 for a general power source is connected to the input terminals 2a and 2b and the AC voltage Vac is supplied via a LISN (line impedance stabilizing network) 60 and the EMI filter 50 for the power source. Further, in this state, a noise voltage spectrum (a noise terminal voltage) between a pair of the terminals TP1 and TP2 that is provided in the LISN 60 is measured.

The EMC filter 50 for the power source is configured with a common mode choke coil CMC, a capacitor Cx between lines and capacitors Cy1 and Cy2 between a line and a FG (frame ground). The LISN 60 is configured with a capacitor C1 and a resistor R1 that are connected between one line and the FG in a state in which the capacitor C1 and the resistor R1 are connected in series, and configured with a capacitor C2 and a resistor R2 that are connected between the other line and the FG in a state in which the capacitor C2 and the resistor R2 are connected in series. The terminals TP1 and TP2 are respectively connected to a node connected between the capacitor C1 and the resistor R1 and a node connected between the capacitor C2 and the resistor R2. Further, a capacitor Cfg corresponds to a capacitor that is formed (or is positively provided) between the output terminal 3b of the converter 1 and the FG and, for instance, has the capacitance value of substantially several thousand pF.

Figure 5:
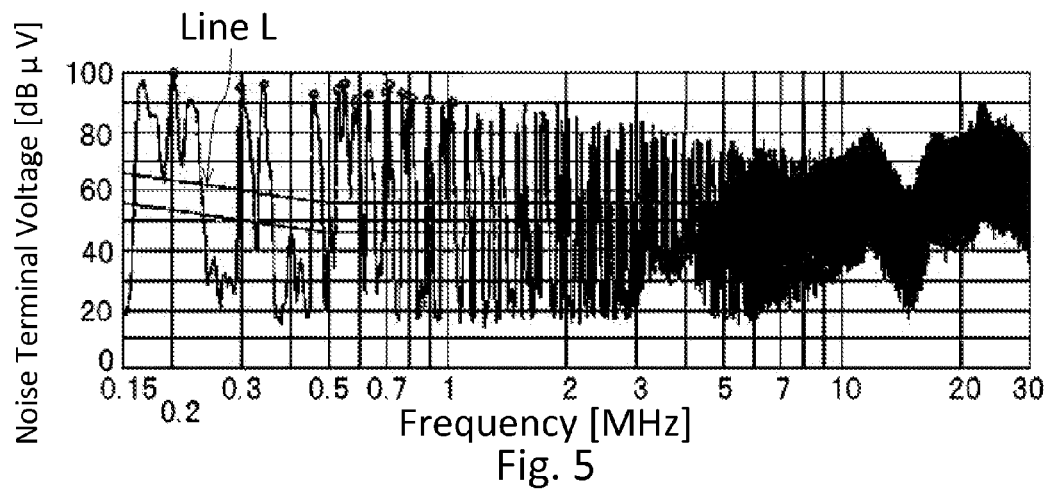
FIG. 5 is a frequency characteristic diagram of a noise terminal voltage with respect to a converter as a comparative example.

First, as a comparative example of the converter 1 according to the embodiment of the present invention, the noise terminal voltage in the state in which the pair of the parallel capacitors 12 and 13 is omitted is measured. A measurement result is shown in FIG. 5. Further, a line of an upper side of two lines that is indicated by "line L" shown in FIG. 5 shows a limit value of a class B by a noise specification (CISPR22/EN55022) (in the same manner as in FIGS. 6 and 7 below). As this measurement result shows, in the configuration in which the parallel capacitors are not used, the noise terminal voltage significantly exceeds the limit value of the class B over the whole frequency range that is prescribed by the noise specification.

It can be considered as follows: the surge current flows in the path from the input terminal 2b, via the common mode choke coil CMC in the EMC filter 50 for the power source, the capacitor C2 in the LISN 60, the resistor R2 in the LISN 60, the capacitor Cfg and the series diode 11 and back to the input terminal 2b due to the voltage fluctuation of the input terminal 2b that is connected to the node connected between the series diodes 10 and 11 explained above. Further, a ringing (a frequency of the ringing corresponds to several hundred kHz-a few MHz) occurs to the surge current due to a resonance of an inductance component (for instance, a few mH) of the common mode choke coil CMC and the capacitor Cfg that configure this path. As a result, because the voltage of the input terminal 2b in the state in which the pair of the parallel capacitors 12 and 13 are omitted rapidly fluctuates (the variation amount of the voltage (the absolute value of dV/dt) is large), amplitude of the ringing becomes extremely large.

Figure 6:
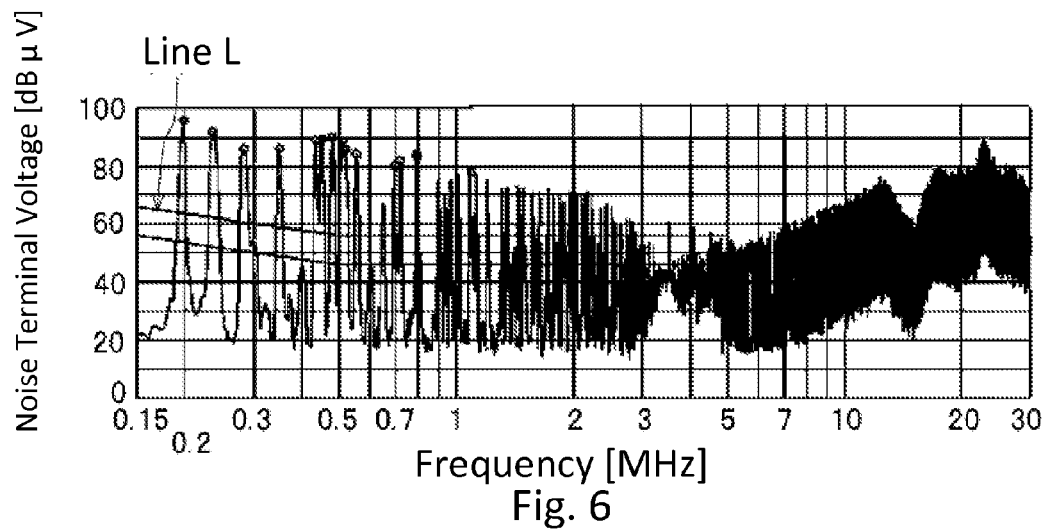
FIG. 6 is a frequency characteristic diagram of a noise terminal voltage with respect to the converter 1 when each of capacitance values of parallel capacitors 12 and 13 is 50 nF according to an embodiment of the present invention.

Next, in the converter 1 according to the embodiment of the present invention, the noise terminal voltage is measured when the capacitance values of the pair of the parallel capacitors 12 and 13 are prescribed to be 50 nF. A measurement result is shown in FIG. 6. As this measurement result shows, though the noise terminal voltage exceeds the limit value of the class B over the whole frequency range that is prescribed by the noise specification, it is confirmed that the noise terminal voltage decreases over the entire frequency range as compared with the configuration in FIG. 5 in which the parallel capacitor is not used (the comparative example).

It is considered that the measurement results shown in FIG. 6 are influenced by two reasons. The two reasons can be considered as follows: (1) as explained above, the capacitance value between the node connected between the series diodes 10, 11 (the input terminal 2b) and the output terminal 3a (that is, the capacitance value of the capacitance that exists in the series diode 10 in parallel), and the capacitance value between the node connected between the series diodes 10, 11 (the input terminal 2b) and the output terminal 3b (that is, the capacitance value of the capacitance that exists in the series diode 11 in parallel) respectively and simply increase due to an addition of the parallel capacitors 12 and 13. As a result, because a charging and discharging time to the parallel capacitance becomes long, the voltage fluctuation of the input terminal 2b is mitigated; and (2) further, in the charging and discharging time for the parallel capacitors 12 and 13, because the parallel capacitors 12, 13 and the first coil 8 or the second coil 9 resonate, the voltage fluctuation of the input terminal 2b is mitigated.

Figure 7:
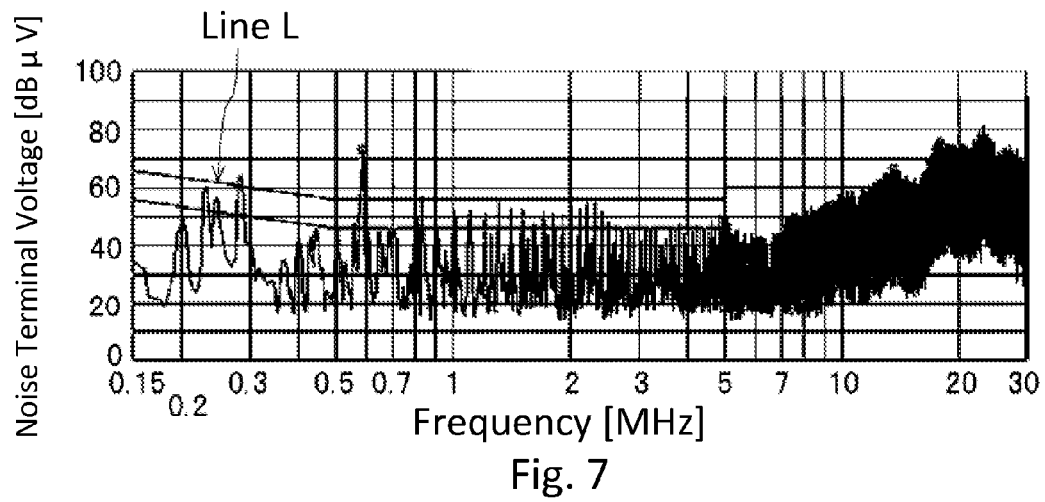
FIG. 7 is a frequency characteristic diagram of a noise terminal voltage with respect to the converter 1 when each of the capacitance values of the parallel capacitors 12 and 13 is 100 nF according to an embodiment of the present invention.

Further, in the converter 1 according to the embodiment of the present invention, the noise terminal voltage is measured when the capacitance values of the pair of the parallel capacitors 12 and 13 are prescribed to be 300 nF. A measurement result is shown in FIG. 7. As this measurement result shows, it is confirmed that the noise terminal voltage further decreases and is suppressed to be substantially equal to or less than the limit value of the class B over the entire frequency range that is prescribed by the noise specification.

Thus, in the converter 1, the pair of the series rectifying devices 10 and 11, which is connected to each other in series in the forward direction, is connected between the pair of the output terminals 3a and 3b of the converter 1, and at the same time, the node connected between the pair of the series rectifying devices 10 and 11 is connected to the input terminal 2b. As a result, every time the polarity of the AC voltage Vac is switched, the pair of the series rectifying devices 10 and 11 is alternately shifted to the ON state. Another parallel capacitor (in the embodiment, the parallel capacitors 12 and 13), which is different from the series rectifying devices 10 and 11, is connected in parallel to at least one series rectifying device (in the embodiment, both of the series diodes 10 and 11) of the pair of the series rectifying devices 10 and 11.

Therefore, according to the converter 1 explained above, the voltage fluctuation of the input terminal 2b can be mitigated by the parallel capacitors 12 and 13. Specifically, the input terminal 2b is connected to the node connected between the series rectifying devices 10 and 11 that fluctuates by the DC voltage Vdc every time the polarity of the AC voltage Vac is switched. Therefore, the surge current that is generated due to the voltage fluctuation can be significantly decreased and the level of the EMI noise (the noise terminal voltage) that is generated can be significantly suppressed. Further, according to the converter 1 explained above, even though the control circuit 15 does not perform the soft start control, in which the duty ratio is gradually increased immediately after the point (the zero-cross point) at which the polarity of the AC voltage Vac is switched, for each of the switches 5 and 7, the level of the EMI noise (the noise terminal voltage) can be significantly suppressed as explained above. As a result, because it is not necessary to use the soft start control, the switching control for each of the switches 5 and 7 by the control circuit 15 can be simple.

Figure 8:
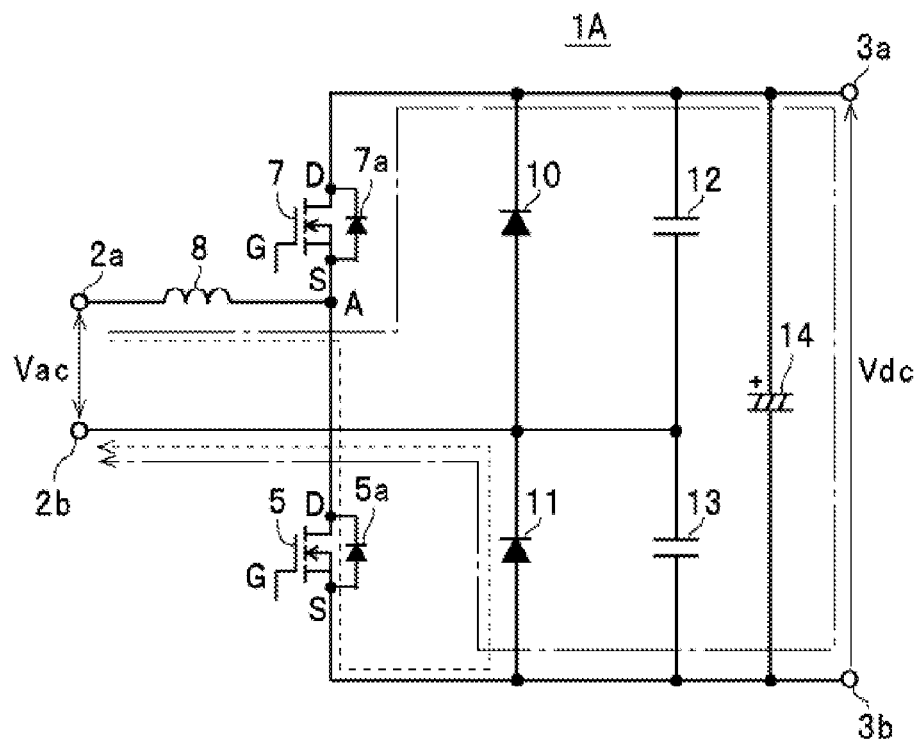
FIG. 8 is a circuit diagram that shows a converter 1A according to an embodiment of the present invention.
Figure 9:
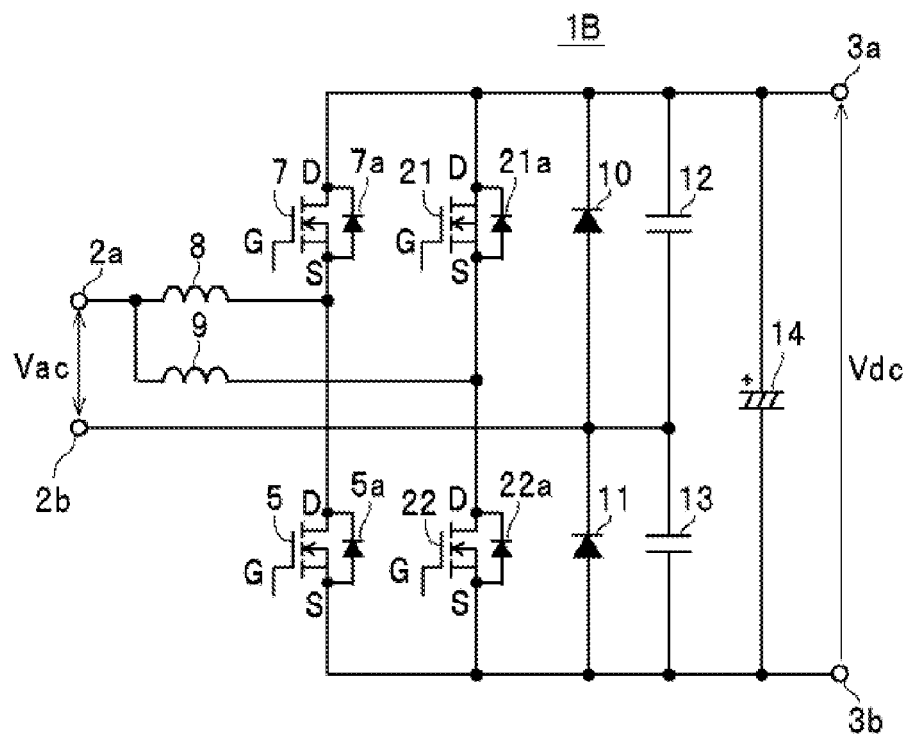
FIG. 9 is a circuit diagram that shows a converter 1B according to an embodiment of the present invention.

Further, in converters 1A and 1B that have configurations shown in FIGS. 8 and 9, in the same manner as the converter 1 explained above, because the input terminal 2b is connected to the node connected between the pair of the series diodes 10 and 11, the voltage of the input terminal 2b also fluctuates by the DC voltage Vdc every time the polarity of the AC voltage Vac is switched. As a result, according to the converters 1A and 1B, in the same manner as the converter 1, another parallel capacitor (the parallel capacitors 12 and 13 in FIGS. 8 and 9), which is different from the series rectifying devices 10 and 11, is also connected in parallel to at least one series rectifying device of the series rectifying devices 10 and 11 (both of the series diodes 10 and 11 in FIGS. 8 and 9). As a result, the level of the EMI noise (the noise terminal voltage) that is generated can be significantly suppressed.

First, a configuration of the converter 1A is explained below with reference to FIG. 8. Further, to easily comprehend the invention, converters 1A-1E are explained as compared with the configuration of the converter 1 below. The redundant explanations with respect to the same configurations as the converter 1 are omitted but the same reference numerals are used for labeling.

The converter 1A is configured by omitting the second coil 9 and the diodes 4, 6 from the converter 1 and providing the second switch 7 at a location of the diode 4 in the converter 1. That is, the second switch 7 is connected between the first switch 5 and the output terminal 3a in order to be in series with the first switch 5. One end of the first coil 8 is connected to the input terminal 2a, and at the same time, the other end is connected to the node A connected between the first switch 5 and the second switch 7.

Next, an operation of the converter 1A is explained. According to the converter 1, based on the AC voltage Vac, when the polarity of the AC voltage Vac corresponds to positive (a period in which the voltage of the input terminal 2a has a positive potential relative to the input terminal 2b), the control circuit 15 also makes only the first switch 5 perform the switching operation. Further, when the polarity of the AC voltage Vac corresponds to negative (a period in which the voltage of the input terminal 2a has a negative potential relative to the input terminal 2b), the control circuit 15 also makes only the second switch 7 perform the switching operation.

In this case, in the period in which the polarity of the AC voltage Vac is positive, when the first switch 5 is in the ON state, the electric current flows in a path that is indicated by a broken line in FIG. 8 and energy is accumulated into the first coil 8. Further, when the first switch 5 is shifted from the ON state to the OFF state in this switching state, because the energy that is accumulated into the first coil 8 is released, the electric current flows in the path that is indicated by a dashed line in FIG. 8, i.e., the path in which the parasitic diode 7a of the second switch 7 is passed through. As a result, the DC voltage Vdc is output from between the pair of the output terminals 3a and 3b.

On the other hand, in the period in which the polarity of the AC voltage Vac is negative, when the second switch 7 is in the ON state, the electric current flows in the path from the input terminal 2b, via the series diode 10, the second switch 7 in the ON state and the first coil 8 and back to the input terminal 2a, and energy is accumulated into the first coil 8. Further, when the second switch 7 is shifted from the ON state to the OFF state in this switching state, because the energy that is accumulated into the first coil 8 is released, the electric current flows in the path from the input terminal 2b, via the series diode 10, the output terminal 3a, the load (not shown) and the output capacitor 14), the output terminal 3b, the parasitic diode 5a of the first switch 5 and the first coil 8, and back to the input terminal 2a. As a result, the DC voltage Vdc is output from between the pair of the output terminals 3a and 3b.

As explained above, also in the converter 1A, when the polarity of the AC voltage Vac is positive (specifically, in the period in which only the first switch 5 performs the switching operation), the series diode 11 always stays in the ON state. When the polarity of the AC voltage Vac is negative (specifically, in the period in which only the second switch 7 performs the switching operation), the series diode 10 always stays in the ON state. As a result, the voltage at the node connected between the pair of the series diodes 10 and 11 (that is, the input terminal 2b) fluctuates by the DC voltage Vdc every time the polarity of the AC voltage Vac is switched in the same manner as the converter 1. Therefore, also in the converter 1A, when the voltage of the node connected between the series diodes 10 and 11 (that is, the input terminal 2b) rapidly fluctuates (when the variation amount of the voltage (the absolute value of dV/dt) is large), the generation of the surge current due to the above situation and an increase of the EMI noise are possible.

However, according to the converter 1A explained above, because the parallel capacitors 12 and 13 are provided in the same manner as the converter 1, the voltage fluctuation of the input terminal 2b, which is connected to the node connected between the series rectifying devices 10 and 11 that fluctuates by the DC voltage Vdc every time the polarity of the AC voltage Vac is switched, can be mitigated by the parallel capacitors 12 and 13. As a result, the surge current that is generated due to this voltage fluctuation can be significantly decreased and the level of the EMI noise (the noise terminal voltage) that is generated can be significantly suppressed.

Next, a configuration according to the converter 1B is explained below with reference to FIG. 9. Further, as shown in FIG. 9, the converter 1B has two pairs of the switch circuit that are equivalent to the switch circuit in the converter 1A (the series circuit of the first switch 5 and the second switch 7, and the first coil 8). Specifically, in the converter 1B, one pair of the two switch circuits corresponds to the series circuit of the first switch 5 and the second switch 7, and the first coil 8. The other pair corresponds to the series circuit of a third switch 21 and a fourth switch 22, and the second coil 9. The converter 1B corresponds to a so-called interleave system bridgeless power factor improvement converter that has a configuration in which the two pairs of switch circuits are connected in series between the output terminals 3a and 3b. Further, a parasitic diode 21a is formed in the third switch 21 and a parasitic diode 22a is formed in the fourth switch 22.

Also in the converter 1B, when the polarity of the AC voltage Vac is positive so as to make the first switch 5 and the fourth switch 22 alternately perform the switching operation, the series diode 11 always stays in the ON state. When the polarity of the AC voltage Vac is negative so as to make the second switch and the third switch 21 alternately perform the switching operation, the series diode 10 always stays in the ON state. Therefore, in the same manner as the converters 1 and 1A, the voltage of the node connected between the pair of the series diodes 10 and 11 (that is, the input terminal 2b) fluctuates by the DC voltage Vdc every time the polarity of the AC voltage Vac is switched.

Therefore, in the same manner as the converters 1 and 1A explained above, also in the converter 1B, when the voltage of the node connected between the series diodes 10 and 11 (that is, the input terminal 2b) rapidly fluctuates (when the variation amount of the voltage (the absolute value of dV/dt) is large), the generation of the surge current due to the above situation and an increase of the EMI noise are possible. However, in the same manner as the converters 1 and 1A, because the converter 1B is also configured with the parallel capacitors 12 and 13, the voltage fluctuation of the input terminal 2b, which is connected to the node connected between the series rectifying devices 10 and 11 and fluctuates by the DC voltage Vdc every time the polarity of the AC voltage Vac is switched, can be mitigated by the parallel capacitors 12 and 13. As a result, the surge current that is generated due to the voltage fluctuation can be decreased and the level of the EMI noise (the noise terminal voltage) that is generated can be significantly suppressed.

By the way, in each of the converters 1, 1A and 1B explained above, the voltage fluctuation of the input terminal 2b, which fluctuates by the DC voltage Vdc every time the polarity of the AC voltage Vac is switched, is mitigated because the parallel capacitors 12, 13 and the coil (the first coil 8 or the second coil 9) that is connected to the input terminal 2 resonate in the charging and discharging time for the parallel capacitors 12 and 13. However, because the electric current that is generated during the resonance (a resonance current) flows in the coil (the first coil 8 or the second coil 9) that is connected to the input terminal 2, the resonance current is superposed with the input current that is input to the input terminal 2.

It is preferred that the unnecessary superposition of the resonance current to the input current explained above is avoided because the noise flows out to an origin of the supply of the AC voltage Vac. The converter 1C according an embodiment of the present invention is explained below with reference to the drawings. Specifically, the converter 1C significantly suppresses the level of the EMI noise (the noise terminal voltage) that is generated in the same manner as the converters 1, 1A and 1B explained above and can decrease the superposition of the resonance current to the input current.

First, a configuration according to the converter 1C is explained with reference to FIG. 10. Further, as an example, the configuration of the converter 1C is explained below by applying this embodiment to the configuration of the converter 1. However, it goes without saying that it can also be applied to the configurations of the converters 1A and 1B.

The converter 1C has a configuration in which the output capacitor 14 is divided into two output capacitors 14a and 14b (the pair of the series capacitors) that correspond to the same capacitance values and are connected in series. The converter 1C also has a configuration in which a series circuit of a bidirectional switch 23 and a resonance inductor 24 is connected between a node connected between the output capacitors 14a, 14b and the node connected between the series diodes 10, 11 (the input terminal 2b). Further, the converter 1C has a configuration in which the bidirectional switch 23 (the first bidirectional switch) is turned ON and OFF by a driving signal S3 that is output from the control circuit 15. In this respect explained above, the converter 1C is different from the converter 1. With respect to other configurations, the converters 1C and 1 have the same configurations.

Further, locations of the bidirectional switch 23 and the resonance inductor 24 can be switched. A switch in which conduction and disconnection states can be bidirectionally controlled can be used as the bidirectional switch 23. The bidirectional switch 23 can be, for instance, a triac or FETs (a field effect transistor) that are connected in series in an opposite direction each other as shown in FIG. 10.

Next, an operation of the converter 1C is explained. Further, as explained above, in the converter 1C that has the same basic configuration as the converter 1, the same component as in the converter 1C is operated in the same manner as the converter 1. The AC voltage Vac is converted into the DC voltage Vdc that is output. At the same time, the level of the EMI noise (the noise terminal voltage) is significantly suppressed.

Figure 11:
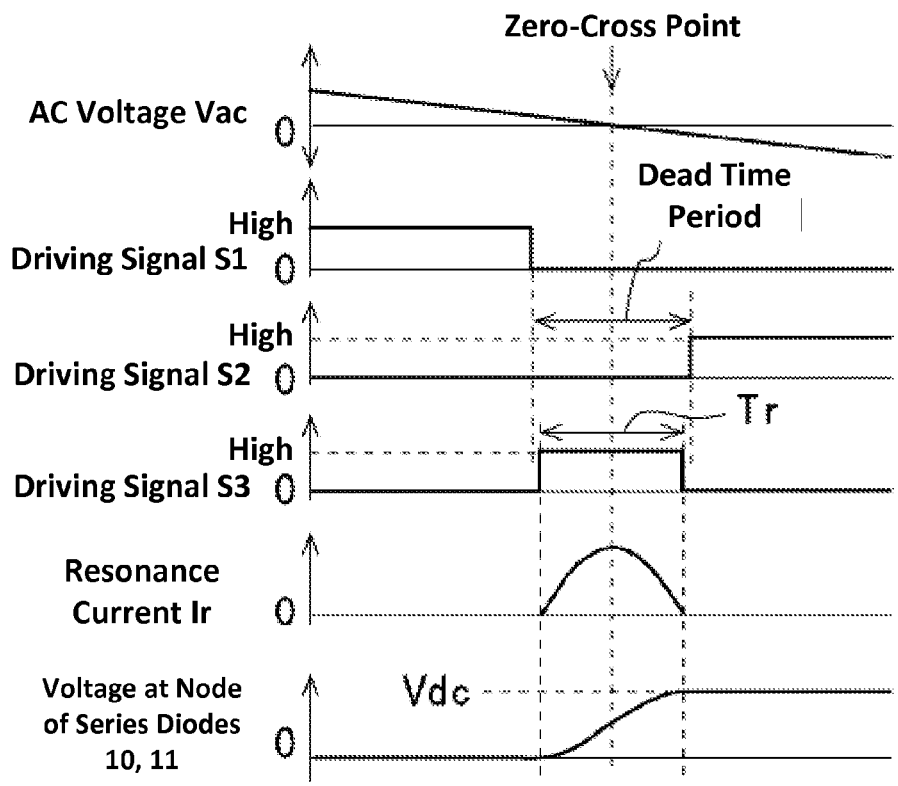
FIG. 11 is a waveform diagram to explain an operation of the converter 1C according to an embodiment of the present invention.

Further, as shown in FIG. 11, in the converter 1C, because the control circuit 15 outputs the driving signal S3 only for a prescribed period Tr, i.e., only during the dead time period, the bidirectional switch 23 is turned ON only for the prescribed period Tr only during the dead time period. Further, the operation at the zero-cross point in which the voltage polarity of the AC voltage Vac is switched from positive to negative during the dead time period is shown in FIG. 11. The control circuit 15 drives the bidirectional switch 23 to be in the ON state only for the prescribed period Tr even during the dead time period at the zero-cross point in which the voltage polarity of the AC voltage Vac is switched from negative to the positive.

As an example, as shown in FIG. 11, the operation at the zero-cross point in which the voltage polarity of the AC voltage Vac is switched from positive to negative during the dead time period is explained. When the dead time period starts, the series diode 11 is in the ON state. Therefore, the voltage of the node connected between the series diodes 10 and 11 (the input terminal 2b) corresponds to a reference potential of the DC voltage Vdc (zero volts). On the other hand, the voltage of the node connected between the output capacitors 14a and 14b corresponds to ½ of the DC voltage Vdc.

Figure 10:
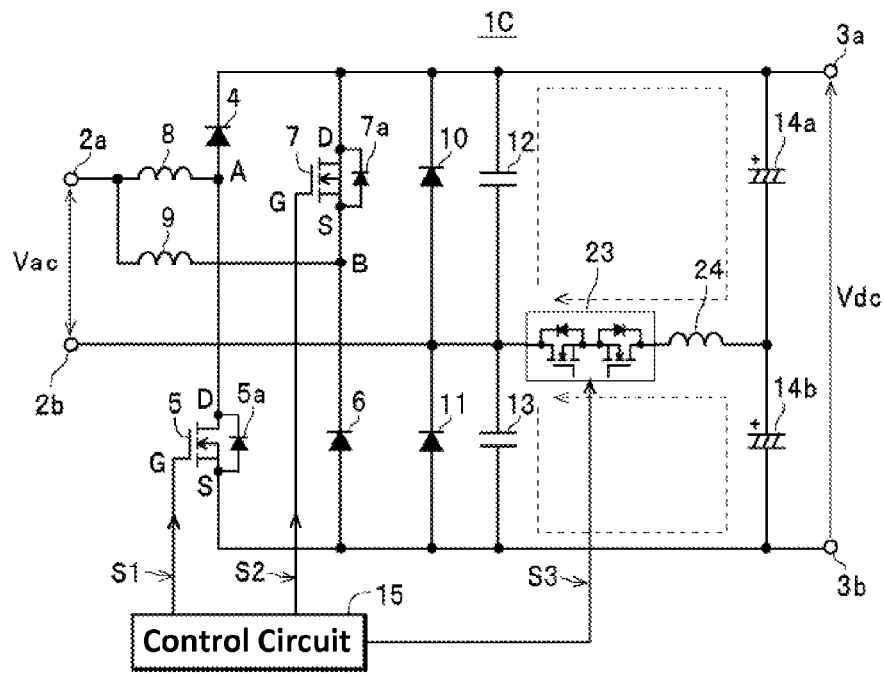
FIG. 10 is a circuit diagram that shows a converter 1C according to an embodiment of the present invention.

In this state, when the bidirectional switch 23 is shifted to the ON state only for the prescribed period Tr, the resonance current respectively flows in two paths that are indicated by broken lines in FIG. 10 due to resonance due to the combined capacitance of the resonance inductor 24 and the parallel capacitors 12 and 13. Specifically, one of the two paths corresponds to a path of a series circuit of the bidirectional switch 23 and the resonance inductor 24, the parallel capacitor 12 and the output capacitor 14a. The other path corresponds to a path of the series circuit explained above, the parallel capacitor 13 and the output capacitor 14b. In the converter 1C, the inductance value of the resonance inductor 24 and the capacitance value of the combined capacitance explained above are defined in order to make the length that is ½ of the resonance period correspond to the length of the prescribed period Tr.

Therefore, as shown in FIG. 11, a current value of a composite current of the resonance current in each path (that is, a resonance current Ir that flows in the resonance inductor 24) increases in a sine wave shape from zero amperes at a commencement of the prescribed period Tr and reaches a peak value in a middle of the prescribed period Tr. After that, the current value decreases in the sine wave shape and becomes zero amperes at a termination of the prescribed period Tr. Further, though an illustration is omitted from FIG. 11, in the same manner as the resonance current Ir, a current value of the resonance current itself in each path increases in the sine wave shape from zero amperes at the commencement of the prescribed period Tr and reaches a peak value in the middle of the prescribed period Tr. After that, the current value decreases in the sine wave shape and becomes zero amperes at the termination of the prescribed period Tr.

As a result, in the converter 1C, because the parallel capacitors 12 and 13 are discharged and charged by the resonance current that changes as explained above, as shown in FIG. 11, the voltage of the node connected between the series diodes 11 and 12 increases gently from zero volts, and after that, increases toward the DC voltage Vdc at a substantially constant change rate. Further, while the change rate gently decreases before reaching the termination of the prescribed period Tr, the voltage converges to the DC voltage Vdc.

Further, with respect to an operation at the zero-cross point in which the voltage polarity of the AC voltage Vac is switched from negative to positive during the dead time period, though an illustration is omitted from the drawings, as compared with the operation when the voltage polarity is switched from positive to negative explained above, an initial voltage of the node connected between the series diodes 10 and 11 (the input terminal 2b) corresponds to the DC voltage Vdc. Therefore, the directions of the resonance currents that flow in the above two paths are opposite from the above case.

Therefore, because the parallel capacitors 12 and 13 are charged and discharged with the resonance currents that flow in the opposite directions from the directions shown in FIG. 10, though an illustration is omitted from the drawings, the voltage of the node connected between the series diodes 11 and 12 decreases gently from the DC voltage Vdc, and after that, decreases toward zero volts at a substantially constant change rate. Further, while the change rate gently decreases before reaching the termination of the prescribed period Tr, the voltage converges to zero volts.

Therefore, the converter 1C can sufficiently suppress the generation of the EMI noise (the noise terminal voltage) caused by the voltage fluctuation of the node connected between the series diodes 11 and 12 from zero volts to the DC voltage Vdc or from the DC voltage Vdc to zero volts.

Further, in the converter 1C, the resonance current for a case in which the voltage of the node connected between the series diodes 11 and 12 is changed from zero volts to the DC voltage Vdc and the resonance current for a case in which the voltage of the node connected between the series diodes 11 and 12 is changed from the DC voltage Vdc to zero volts flow only in the two paths explained above and do not flow out in the input terminal 2. Specifically, one of the two paths corresponds to a path of the series circuit of the bidirectional switch 23 and the resonance inductor 24, the parallel capacitor 12 and the output capacitor 14a. The other path corresponds to a path of the series circuit explained above, the parallel capacitor 13 and the output capacitor 14b. Therefore, according to the converter 1C, the superposition of the resonance current to the input current can be avoided.

Figure 12:
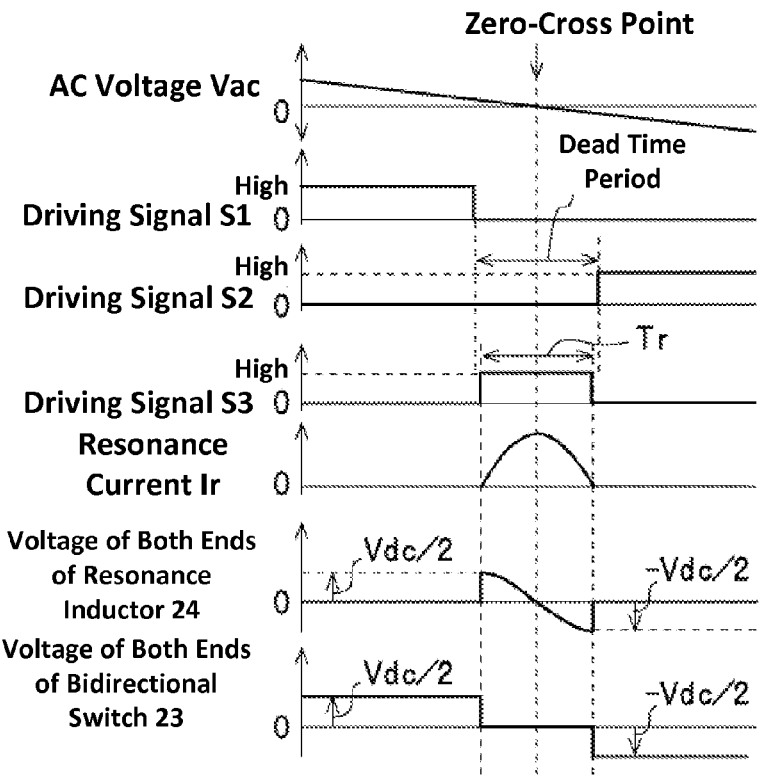
FIG. 12 is a waveform diagram to explain the operation of the converter 1C according to an embodiment of the present invention.

By the way, in the converter 1C explained above, the inductance value of the resonance inductor 24 and the capacitance value of the combined capacitance of the parallel capacitors 12 and 13 are defined in order to make the length that is ½ of the resonance period correspond to the length of the prescribed period Tr. As a result, the converter 1C has an ideal configuration in which the current value of the composite current (the resonance current Ir that flows in the resonance inductor 24) of the resonance currents in each path becomes zero amperes at the termination of the prescribed period Tr. Therefore, as shown in FIG. 12, a voltage of both ends of the resonance inductor 24 accurately changes from the voltage value of ½ of the DC voltage Vdc to the voltage value that has the same absolute value as this voltage value and has the opposite polarity from this voltage value during the prescribed period Tr. Therefore, the surge voltage is not generated in particular.

Figure 13:
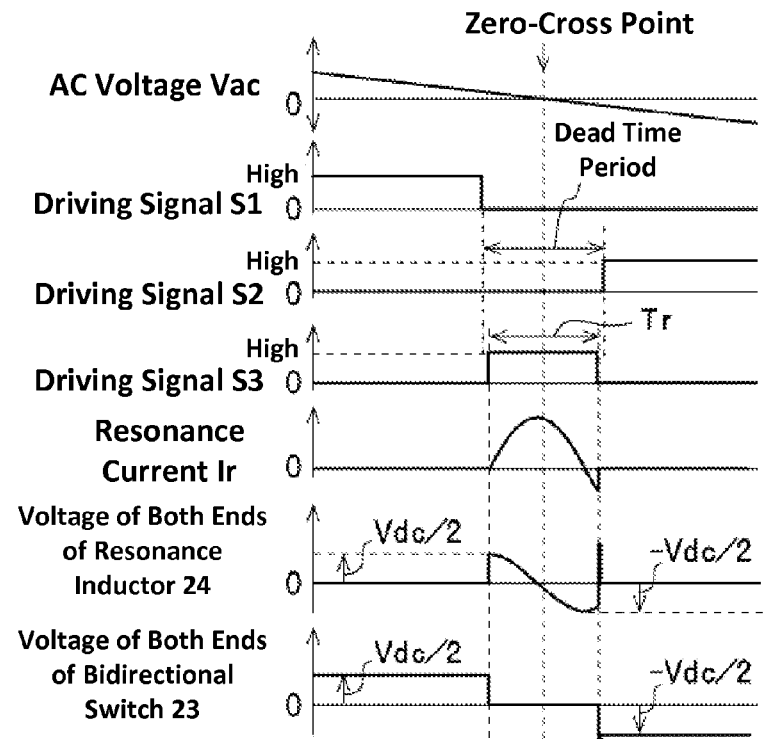
FIG. 13 is a waveform diagram to explain the operation of the converter 1C according to an embodiment of the present invention.

However, in reality, the inductance value of the resonance inductor 24 and the each capacitance value of the parallel capacitors 12 and 13 vary within each tolerance range by being affected by ambient temperature. Therefore, it may be difficult to make the current value of the resonance current Ir explained above correspond to exactly zero amperes at the termination of the prescribed period Tr as designed. In general, as shown in FIG. 13, the state in which because the current value of the resonance current Ir becomes zero amperes before the termination of the prescribed period Tr, the current value flows in the opposite direction at the termination of the prescribed period Tr, may occur. Further, as shown in FIG. 14, the state in which the current value of the resonance current Ir does not reach zero amperes yet at the termination of the prescribed period Tr may also occur.

Figure 14:
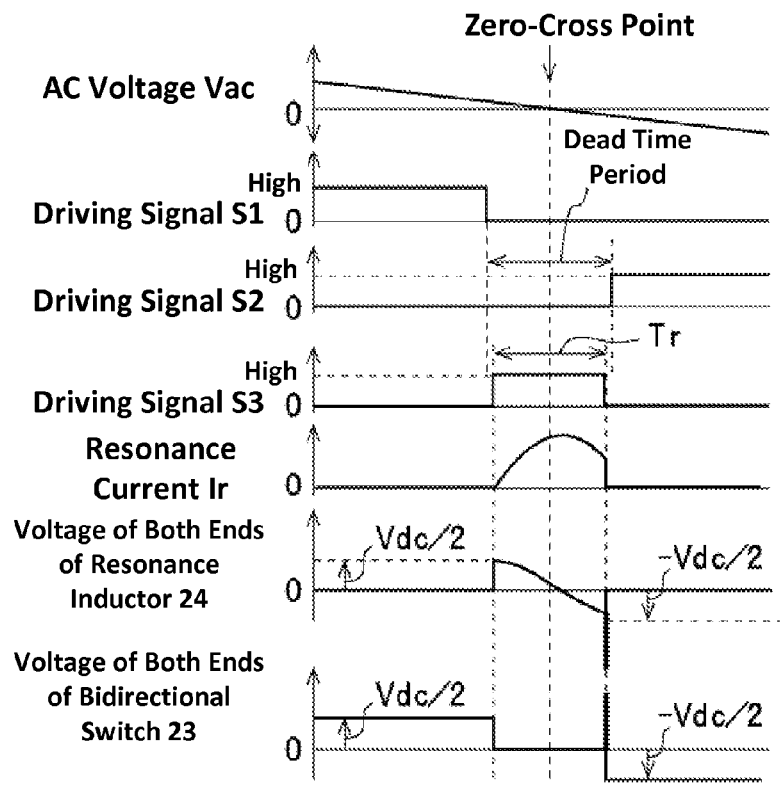
FIG. 14 is a waveform diagram to explain the operation of the converter 1C according to an embodiment of the present invention.

In this case, because the bidirectional switch 23 is in the OFF state in the state in which the current value of the resonance current Ir that flows in the resonance inductor 24 does not correspond to zero amperes, as indicated by the bold lines in FIGS. 13 and 14, the voltage of both ends of the resonance inductor 24 changes in a form of pulses (a rise or a fall) at the termination of the prescribed period Tr. A pulse voltage (the surge voltage) that corresponds to the change is applied to both ends of the bidirectional switch 23. Therefore, as indicated by the bold lines in FIGS. 13 and 14, it is possible that the voltage of both ends of the bidirectional switch 23 also changes in the form of pulses (the rise or the fall) and exceeds a breakdown voltage of the bidirectional switch 23. As a result, it is not preferred for the bidirectional switch 23.

Figure 15:
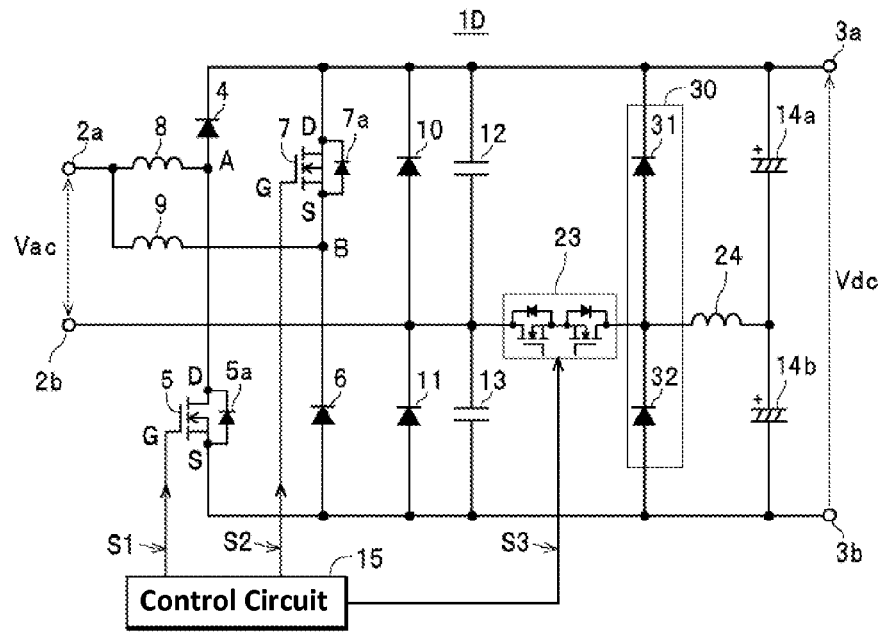
FIG. 15 is a circuit diagram that shows a converter 1D according to an embodiment of the present invention.

Therefore, the converter 1D as shown below (refer to FIG. 15) has a clamp circuit 30 that can suppress not only the changes in a form of pulses for the voltage of both ends of the resonance inductor 24 but also a degree of the changes in the form of pulses of the voltage of both ends of the bidirectional switch 23. In the Converter 1D that has the configuration shown in FIG. 15, the clamp circuit 30 is configured as a pair of clamping rectifying devices (in the embodiment, as an example, diodes 31 and 32). Specifically, the pair of the clamping rectifying devices are connected in series in the forward direction, and at the same time, a current output terminal is connected to the one output terminal 3a and a current input terminal is connected to the other output terminal 3b, and the node connected between the pair of clamping rectifying devices is connected to the node connected between the resonance inductor 24 and the bidirectional switch 23.

Figure 16:
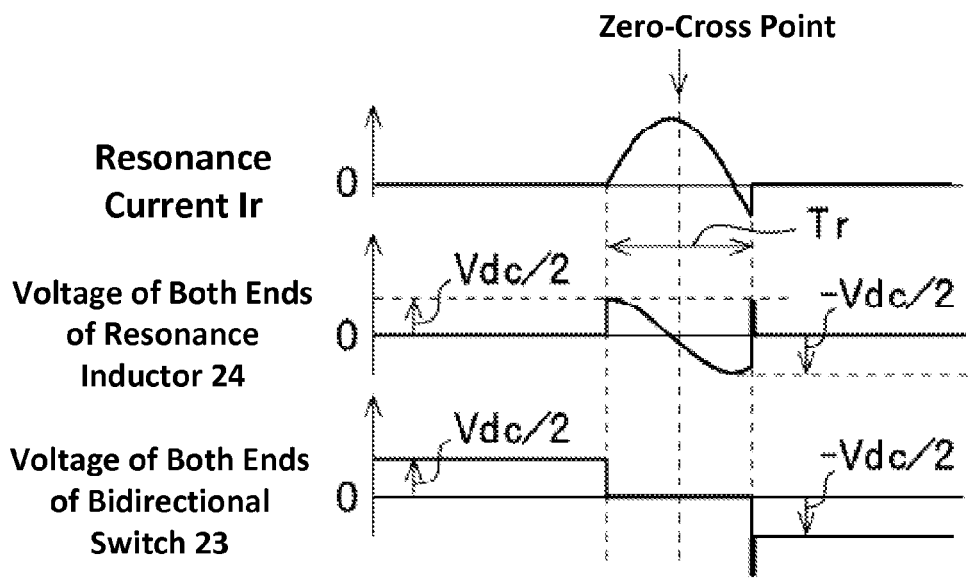
FIG. 16 is a waveform diagram to explain an operation of the converter 1D according to an embodiment of the present invention.
Figure 17:
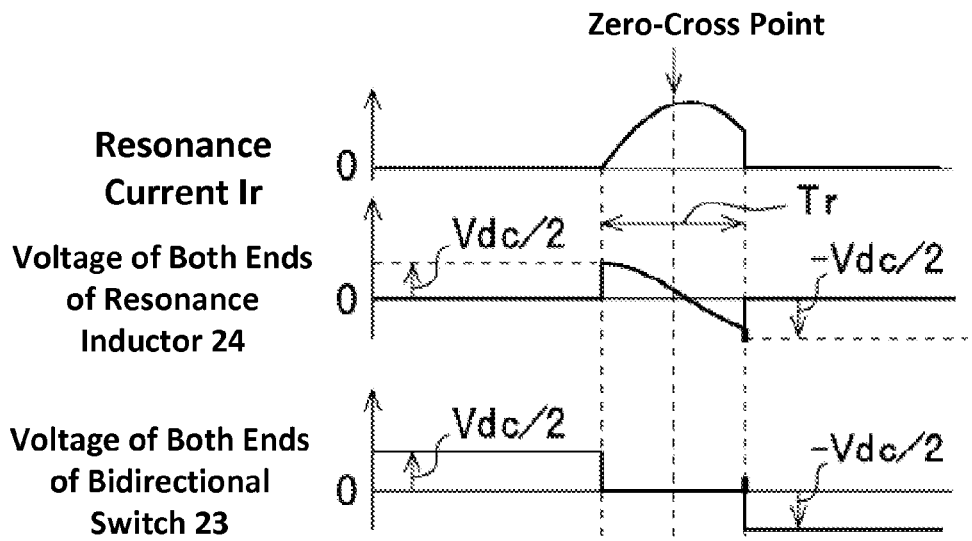
FIG. 17 is a waveform diagram to explain the operation of the converter 1D according to an embodiment of the present invention.

According the converter 1D that has the above configuration, because the voltage at the end of the side of the node connected between the output capacitors 14a and 14b of the resonance inductor 24 is defined to be ½ of the DC voltage Vdc, even when the change in the form of pulses generates at the voltage of both ends of the resonance inductor 24 as shown in FIGS. 13 and 14, as shown in FIGS. 16 and 17, the voltage of both ends of the resonance inductor 24 including the change in the form of pulses can be suppressed within a voltage range that corresponds to equal to or more than −Vdc/2 and equal to or less than +Vdc/2. Therefore, as shown in FIGS. 16 and 17, the voltage of both ends of the bidirectional switch 23 can also be suppressed within the voltage range that does not become excessive. As a result, an outbreak of a state, in which the voltage of both ends of the bidirectional switch 23 exceeds a withstand (breakdown) voltage of the bidirectional switch 23 can be certainly prevented.

Figure 18:
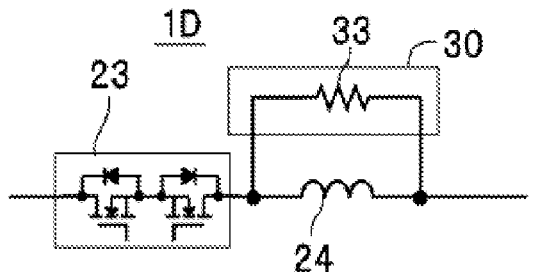
FIG. 18 is a circuit diagram that shows another configuration of a clamp circuit 30 according to an embodiment of the present invention.

Further, the clamp circuit 30 can also be configured as a clamp circuit that is connected to the resonance inductor 24 in parallel. Specifically, as shown in FIG. 18, the clamp circuit 30 can be configured as a resistor 33 that is connected in parallel between both ends of the resonance inductor 24. Further, as shown in FIG. 19, the clamp circuit 30 can also be configured as a pair of Zener diodes 34 and 35 (the Zener diodes in which a Zener voltage Vz is somewhat higher than the voltage of ½ of the DC voltage Vdc) that are connected in parallel between both ends of the resonance inductor 24 in the state in which the pair of Zener diodes 34 and 35 are connected in series in the opposite direction each other (in the embodiment, as an example, the cathode terminals are connected each other).

Figure 20:
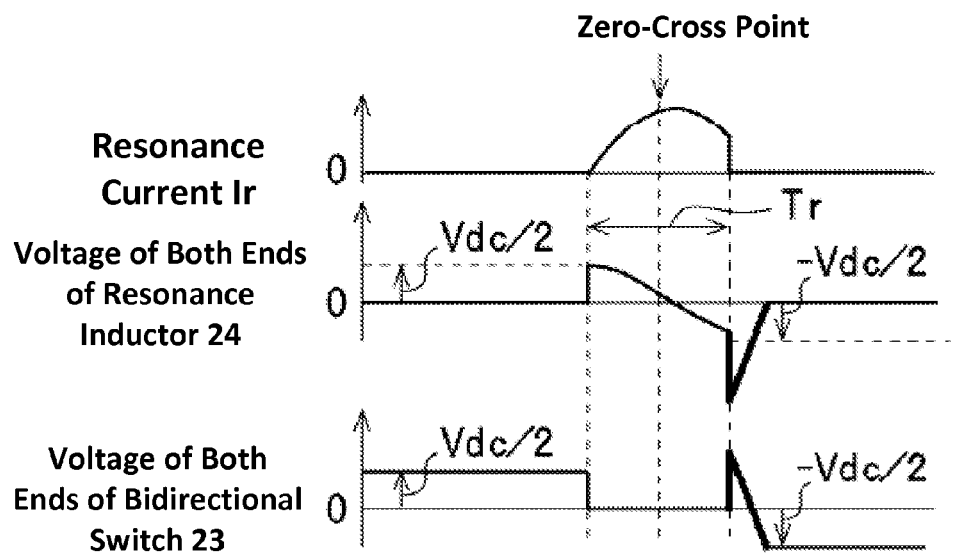
FIG. 20 is a waveform diagram to explain an operation of the converter 1D that is provided with the clamp circuit 30 shown in FIG. 18 according to an embodiment of the present invention.

In this case, in the clamp circuit 30 shown in FIG. 18, as shown in FIG. 20, the resistor 33 attenuates the voltage (the voltage of both ends), which is generated between both ends of the resonance inductor 24 when the bidirectional switch 23 is controlled to be in the OFF state, by a time constant (L/R) of an inductance value L of the resonance inductor 24 and a resistor value R of the resistor 33. Further, FIG. 20 shows an embodiment in which the current value of the resonance current Ir does not reach zero amperes at the termination of the prescribed period Tr yet. However, even when the current value of the resonance current Ir reaches zero amperes before the termination of the prescribed period Tr and flows in the opposite direction at the termination of the prescribed period Tr, the resistor 33 attenuates the voltage of both ends by the time constant (L/R) explained above. Specifically, it is preferred that the inductance value L of the resonance inductor 24 and the resistor value R of the resistor 33 are defined to make the value of the time constant (L/R) correspond to between several tens µs and several hundred µs.

Figure 19:
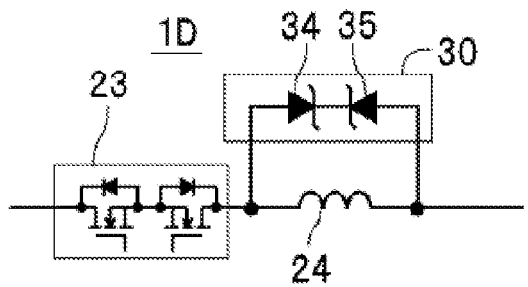
FIG. 19 is a circuit diagram that shows another configuration of the clamp circuit 30 according to an embodiment of the present invention.
Figure 21:
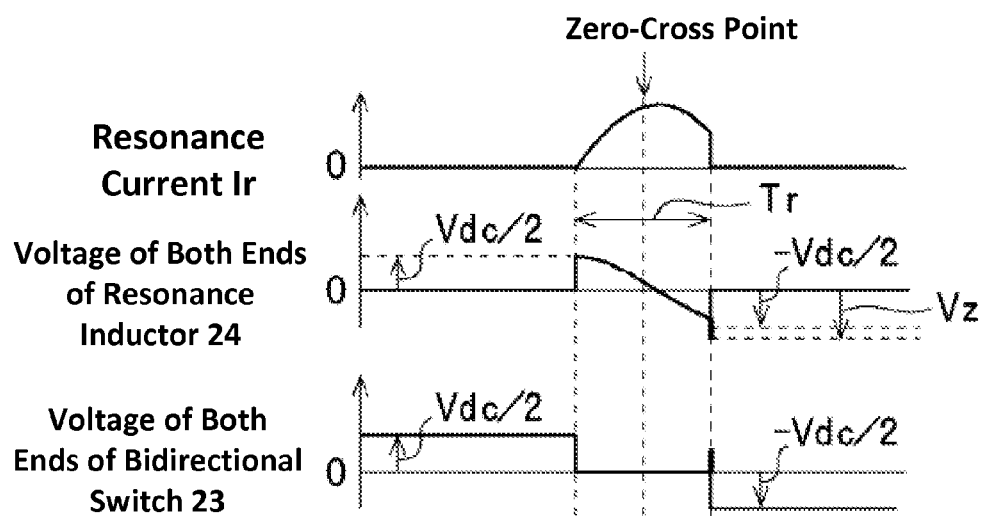
FIG. 21 is a waveform diagram in order to explain an operation of the converter 1D that is provided with the clamp circuit 30 shown in FIG. 19 according to an embodiment of the present invention.

Further, in the clamp circuit 30 shown in FIG. 19, as shown in FIG. 21, when the voltage (the voltage of both ends) that is generated between both ends of the resonance inductor 24 reaches the Zener voltage Vz, the Zener diodes 34 and 35 clamp the voltage of both ends to the Zener voltage Vz. Further, FIG. 21 shows an embodiment in which the current value of the resonance current Ir does not reach zero amperes at the termination of the prescribed period Tr yet. However, even when the current value of the resonance current Ir reaches zero amperes before the termination of the prescribed period Tr and flows in the opposite direction at the termination of the prescribed period Tr, when the voltage of both ends reaches the Zener voltage Vz, the Zener diodes 34 and 35 clamp the voltage of both ends to the Zener voltage Vz.

Therefore, also according to the converter 1D that has the clamp circuit 30 shown in FIGS. 18 and 19, the outbreak of a state, in which the voltage of both ends of the bidirectional switch 23 exceeds the withstand (breakdown) voltage of the bidirectional switch 23 can be certainly prevented.

Figure 22:
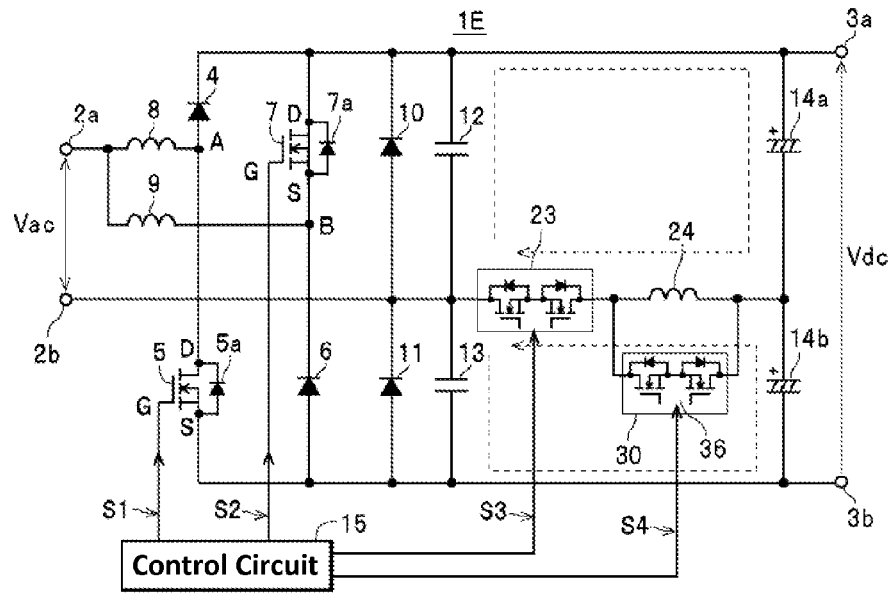
FIG. 22 is a circuit diagram that shows a converter 1E according to an embodiment of the present invention.
Figure 23:
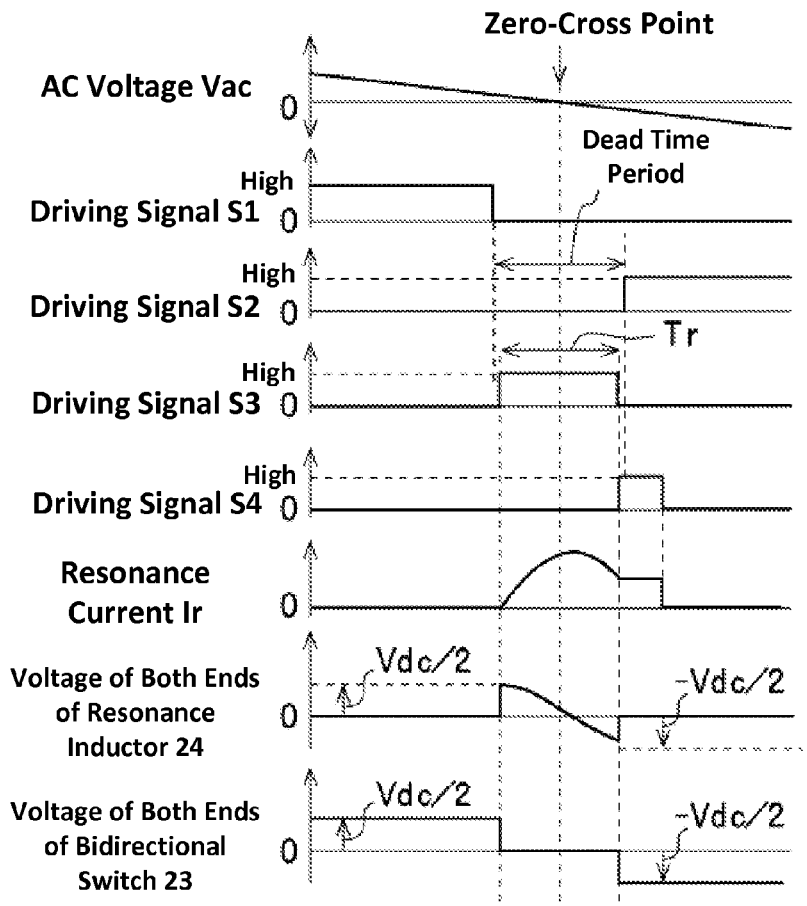
FIG. 23 is a waveform diagram to explain an operation of the converter 1E according to an embodiment of the present invention.

Further, as the converter 1E shown in FIG. 22, the clamp circuit 30, which is connected to the resonance inductor 24 in parallel, can also be configured as a bidirectional switch 36 (a second bidirectional switch) that is connected in parallel between both ends of the resonance inductor 24. In this clamp circuit 30, the bidirectional switch 36 is turned ON by a driving signal S4 that is output from the control circuit 15. Specifically, as shown in FIG. 23, at the same time as the control circuit 15 stops the output of the driving signal S3 (that is, at the same time as the bidirectional switch 36 is driven from the ON state to the OFF state), the driving signal S4 is output for the predetermined period of time (for instance, a period of time that is less than the length of the dead time period and is prescribed in advance according to such as experimentation). Further, in the same manner as the bidirectional switch 23, the bidirectional switch 36 can be configured as the triac or the FETs that are connected in series in the opposite direction each other shown in FIG. 22.

Therefore, in the converter 1E, both ends of the resonance inductor 24 are temporarily short-circuited by the bidirectional switch 36 at the same time as the end of the ON state of the bidirectional switch 23 (at the same time as the termination of the prescribed period Tr).

As explained above, because the resonance currents that flow in the two paths including the bidirectional switch 23 and the resonance inductor 24 (the paths that are indicated by the broken lines shown in FIG. 22) do not correspond to exact zero amperes at the termination of the prescribed period Tr, the voltage in the form of pulses, which is generated not only at the voltage of both ends of the resonance inductor 24 but also at the voltage of both ends of the bidirectional switch 23, are generated at the termination of the prescribed period Tr, i.e., at the termination of the output period of the driving signal S3.

Therefore, according to the converter 1E, the bidirectional switch 36 of the clamp circuit 30 is temporarily shifted to the OFF state at the same time as the termination of the prescribed period Tr (that is, at the same as the bidirectional switch 23 is shifted to the OFF state) and both ends of the resonance inductor 24 are short-circuited by the driving signal S4. As a result, as shown in FIG. 23, the converter 1E can make the voltage in the form of pulses avoid being generated not only at the voltage of both ends of the resonance inductor 24 but also at the voltage of both ends of the bidirectional switch 23. That is, also according to the converter 1E, the outbreak of a state, in which the voltage of both ends of the bidirectional switch 23 exceeds the withstand (breakdown) voltage of the bidirectional switch 23 can be certainly prevented.

Further, the loss may be generated in the clamp circuit 30 because of using the clamp circuit 30 shown in FIGS. 18, 19 and 22. However, because a generation period of this loss is extremely short as compared with a half cycle of the AC voltage Vac, the loss is also extremely small. Therefore, it does not cause a problem.

The bridgeless power factor improvement converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A bridgeless power factor improvement converter, comprising:
   a pair of input terminals to which an AC voltage is input, the pair of input terminals including a first input terminal and a second input terminal;
   a pair of output terminals from which an output voltage is output, the pair of output terminals including a first output terminal and a second output terminal, the first output terminal having a positive potential relative to the second output terminal;
   a first rectifier having a first current input terminal and a first current output terminal, the first current output terminal being connected to the first output terminal;
   a first switch that is connected between the second output terminal and the first current input terminal;
   a second rectifier having a second current input terminal and a second current output terminal, the second current input terminal being connected to the second output terminal;
   a second switch that is connected between the first output terminal and the second current output terminal;
   a first coil that is connected between the first input terminal and a first node connected between the first rectifier and the first switch;
   a second coil that is connected between the first input terminal and a second node connected between the second rectifier and the second switch;
   a pair of series rectifiers that are connected in series in a forward direction via a third node and that have a third current input terminal and a third current output terminal that are opposite to each other, the third current output terminal being connected to the first output terminal, the third current input terminal being connected to the second output terminal, the third node being connected to the second input terminal;
   a capacitor that has first and second capacitor ends that are opposite to each other, the first capacitor end being directly connected to the third node, the second capacitor end being directly connected to one of the third current input terminal and the third current output terminal of the pair of series rectifiers so that the capacitor is serially connected between the third node and one of the third current input terminal and the third current output terminal of the pair of series rectifiers;
   a pair of output capacitors that are connected in series via a fourth node between the first and second output terminals;
   a resonance inductor and a first bidirectional switch that are connected in series via a fifth node between the third node and the fourth node; and
   a control circuit that switches the first and second switches according to the AC voltage, wherein
   when the first input terminal has a positive potential relative to the second input terminal, the control circuit switches only the first switch, and
   when the first input terminal has a negative potential relative to the second input terminal, the control circuit switches only the second switch.

2. The bridgeless power factor improvement converter according to claim 1, wherein
   the capacitor is provided independently from the pair of series rectifiers.

3. The bridgeless power factor improvement converter according to claim 1,
   wherein
   the control circuit drives the first bidirectional switch so as to be in an ON state in synchronization with a polarity change of the AC voltage during a dead time period between an ON period of the first switch and an ON period of the second switch.

4. The bridgeless power factor improvement converter according to claim 3, further comprising:
   a pair of clamping rectifiers that are connected in series in a forward direction via a sixth node and that have a clamping current input terminal and a clamping current output terminal, the clamping current output terminal being connected to the first output terminal, the clamping current input terminal being connected to the second output terminal, the sixth node being connected to the fifth node.

5. The bridgeless power factor improvement converter according to claim 3, further comprising:
   a clamping circuit that is connected to the resonance inductor in parallel, wherein
   the clamping circuit decreases a voltage that is generated between both ends of the resonance inductor.

6. The bridgeless power factor improvement converter according to claim 5, wherein
   the clamping circuit is a resistor that is connected to the resonance inductor in parallel.

7. The bridgeless power factor improvement converter according to claim 5, wherein
   the clamping circuit is a pair of Zener diodes that are connected in series in an opposite direction to each other and that are connected to the resonance inductor in parallel.

8. The bridgeless power factor improvement converter according to claim 5, wherein
   the clamping circuit is a second bidirectional switch that is connected to the resonance inductor in parallel, and
   the control circuit drives the first bidirectional switch to be in an OFF state from an ON state and concurrently drives the second bidirectional switch to be temporarily in the ON state.

9. The bridgeless power factor improvement converter according to claim 1, further comprising:
   a second capacitor that has third and fourth capacitor ends that are opposite to each other, the third capacitor end being directly connected to the third node, the fourth capacitor end being directly connected to the other of the third current input terminal and the third current output terminal of the pair of series rectifiers so that the second capacitor is serially connected between the third node and the other of the third current input terminal and the third current output terminal of the pair of series rectifiers, wherein
   the capacitor and the second capacitor are serially connected to each other between the third current input terminal and the third current output terminal, and
   the capacitor and the second capacitor are respectively connected to the pair of series rectifiers in parallel.

10. A bridgeless power factor improvement converter, comprising:
    a pair of input terminals to which an AC voltage is input, the pair of input terminals including a first input terminal and a second input terminal;
    a pair of output terminals from which an output voltage is output, the pair of output terminals including a first output terminal and a second output terminal, the first output terminal having a positive potential relative to the second output terminal;

a first switch that is connected to the second output terminal;

a second switch that is connected between the first switch and the first output terminal so as to be connected with the first switch in series;

a coil that is connected between the first input terminal and a first node connected between the first switch and the second switch;

a pair of series rectifiers that are connected in series in a forward direction via a second node and that have a first current input terminal and a first current output terminal that are opposite to each other, the first current output terminal being connected to the first output terminal, the first current input terminal being connected to the second output terminal, the second node being connected to the second input terminal;

a capacitor that has first and second capacitor ends that are opposite to each other, the first capacitor end being directly connected to the second node, the second capacitor end being directly connected to one of the first current input terminal and the first current output terminal of the pair of series rectifiers so that the capacitor is serially connected between the second node and one of the first current input terminal and the first current output terminal of the pair of series rectifiers;

a pair of output capacitors that are connected in series via a third node between the first and second output terminals;

a resonance inductor and a first bidirectional switch that are connected in series via a fourth node between the second node and the third node; and a control circuit that switches the first and second switches according to the AC voltage, wherein when the first input terminal has a positive potential relative to the second input terminal, the control circuit switches only the first switch, and when the first input terminal has a negative potential relative to the second input terminal, the control circuit switches only the second switch.

11. The bridgeless power factor improvement converter according to claim 10, wherein
the capacitor is provided independently from the pair of series rectifiers.

12. The bridgeless power factor improvement converter according to claim 10,
wherein
the control circuit drives the first bidirectional switch so as to be in an ON state in synchronization with a polarity change of the AC voltage during a dead time period between an ON period of the first switch and an ON period of the second switch.

13. The bridgeless power factor improvement converter according to claim 12, further comprising:
a pair of clamping rectifiers that are connected in series in a forward direction via a fifth node and that have a clamping current input terminal and a clamping current output terminal, the clamping current output terminal being connected to the first output terminal, the clamping current input terminal being connected to the second output terminal, the fifth node being connected to the fourth node.

14. The bridgeless power factor improvement converter according to claim 12, further comprising:
a clamping circuit that is connected to the resonance inductor in parallel, wherein
the clamping circuit decreases a voltage that is generated between both ends of the resonance inductor.

15. The bridgeless power factor improvement converter according to claim 14, wherein
the clamping circuit is a resistor that is connected to the resonance inductor in parallel.

16. The bridgeless power factor improvement converter according to claim 14, wherein
the clamping circuit is a pair of Zener diodes that are connected in series in an opposite direction to each other and that are connected to the resonance inductor in parallel.

17. The bridgeless power factor improvement converter according to claim 14, wherein
the clamping circuit is a second bidirectional switch that is connected to the resonance inductor in parallel, and
the control circuit drives the first bidirectional switch to be in an OFF state from an ON state and concurrently drives the second bidirectional switch to be temporarily in the ON state.

18. The bridgeless power factor improvement converter according to claim 10, further comprising:
a second capacitor that has third and fourth capacitor ends that are opposite to each other, the third capacitor end being directly connected to the second node, the fourth capacitor end being directly connected to the other of the first current input terminal and the first current output terminal of the pair of series rectifiers so that the second capacitor is serially connected between the second node and the other of the first current input terminal and the first current output terminal of the pair of series rectifiers, wherein
the capacitor and the second capacitor are serially connected to each other between the first current input terminal and the first current output terminal, and
the capacitor and the second capacitor are respectively connected to the pair of series rectifiers in parallel.

19. A bridgeless power factor improvement converter, comprising:
a pair of input terminals to which an AC voltage is input, the pair of input terminals including a first input terminal and a second input terminal;
a pair of output terminals from which an output voltage is output, the pair of output terminals including a first output terminal and a second output terminal, the first output terminal having a positive potential relative to the second output terminal;
a first rectifier having a first current input terminal and a first current output terminal, the first current output terminal being connected to the first output terminal;
a first switch that is connected between the second output terminal and the first current input terminal;
a second rectifier having a second current input terminal and a second current output terminal, the second current input terminal being connected to the second output terminal;
a second switch that is connected between the first output terminal and the second current output terminal;
a first coil that is connected between the first input terminal and a first node connected between the first rectifier and the first switch;
a second coil that is connected between the first input terminal and a second node connected between the second rectifier and the second switch;
a pair of series rectifiers that are connected in series in a forward direction via a third node and that have a third current input terminal and a third current output terminal that are opposite to each other, the third current output terminal being connected to the first output terminal, the third current input terminal being connected to the second output terminal, the third node being connected to the second input terminal;

a capacitor that has first and second capacitor ends that are opposite to each other, the first capacitor end being directly connected to the third node, the second capacitor end being directly connected to one of the third current input terminal and the third current output terminal of the pair of series rectifiers so that the capacitor is serially connected between the third node and one of the third current input terminal and the third current output terminal of the pair of series rectifiers;

a second capacitor that has third and fourth capacitor ends that are opposite to each other, the third capacitor end being directly connected to the third node, the fourth capacitor end being directly connected to the other of the third current input terminal and the third current output terminal of the pair of series rectifiers so that the second capacitor is serially connected between the third node and the other of the third current input terminal and the third current output terminal of the pair of series rectifiers; and a control circuit that switches the first and second switches according to the AC voltage, wherein when the first input terminal has a positive potential relative to the second input terminal, the control circuit switches only the first switch, when the first input terminal has a negative potential relative to the second input terminal, the control circuit switches only the second switch, the capacitor and the second capacitor are serially connected to each other between the third current input terminal and the third current output terminal, the capacitor and the second capacitor are respectively connected to the pair of series rectifiers in parallel, and wherein when a polarity change of the AC voltage occurs, the capacitor and the second capacitor are completely discharged.

* * * * *